(12) United States Patent
Otaguro

(10) Patent No.: US 8,963,452 B2
(45) Date of Patent: Feb. 24, 2015

(54) MOTOR DRIVE DEVICE, MAGNETIC DISK STORAGE DEVICE, AND ELECTRONIC APPLIANCE

(71) Applicant: Rohm Co., Ltd., Kyoto-shi, Kyoto (JP)

(72) Inventor: Yoshito Otaguro, Kyoto (JP)

(73) Assignee: Rohm Co., Ltd. (JP)

( * ) Notice: Subject to any disclaimer, the term of this patent is extended or adjusted under 35 U.S.C. 154(b) by 229 days.

(21) Appl. No.: 13/623,235

(22) Filed: Sep. 20, 2012

(65) Prior Publication Data
US 2014/0078610 A1    Mar. 20, 2014

(51) Int. Cl.
| H02K 7/14 | (2006.01) |
|---|---|
| G11B 19/20 | (2006.01) |
| H02P 3/14 | (2006.01) |
| G11B 19/28 | (2006.01) |
| H02P 29/02 | (2006.01) |
| H02P 27/06 | (2006.01) |
| H02M 1/00 | (2006.01) |

(52) U.S. Cl.
CPC .............. *G11B 19/2072* (2013.01); *H02P 3/14* (2013.01); *G11B 19/28* (2013.01); *H02P 29/026* (2013.01); *H02P 27/06* (2013.01); *H02M 2001/0096* (2013.01)
USPC .............................................. 318/3

(58) Field of Classification Search
CPC .................................................. G11B 19/2072
USPC ............................................................ 318/3
See application file for complete search history.

(56) References Cited

U.S. PATENT DOCUMENTS

| 6,188,192 | B1 | 2/2001 | Chen | |
|---|---|---|---|---|
| 7,054,089 | B2 * | 5/2006 | Kokami | 360/73.03 |
| 7,158,332 | B2 * | 1/2007 | Kokami | 360/75 |
| 7,309,967 | B2 * | 12/2007 | Moser et al. | 318/376 |

* cited by examiner

*Primary Examiner* — Erick Glass
(74) *Attorney, Agent, or Firm* — Cantor Colburn LLP

(57) ABSTRACT

A motor drive device has: a power supply line to which a power supply voltage is applied; a ground line to which a ground voltage is applied; and a first motor driver that, when the power supply voltage is normal, rotates an N-phase first motor (where N is an integer of 2 or more) by using the supply voltage and, when the power supply voltage is abnormal, generates a rectified voltage from phase voltages of different phases appearing while the first motor is idling to regenerate the rectified voltage to the power supply line. The first motor driver, when generating the rectified voltage, boosts the rectified voltage by periodically repeating a brake cycle to make all the terminals of the different phases of the first motor conduct to the ground line and a boost cycle to rectify the phase voltages of the different phases synchronously while making at least one of the terminals of the different phases conduct to the power supply line.

16 Claims, 16 Drawing Sheets

MOTOR DRIVE DEVICE, MAGNETIC DISK STORAGE DEVICE, AND ELECTRONIC APPLIANCE

BACKGROUND OF THE INVENTION

1. Field of the Invention

The invention disclosed in this specification relates to a motor drive device, a magnetic disk storage device and an electronic appliance that use the motor drive device.

2. Description of Related Art

Generally, in a hard disk drive used in various applications, the hard disk drive includes a function (a power off retract function) that operates a magnetic head automatically to an outside lamp mechanism further than an outermost circumference of a platter when a power supply voltage applied from host computer is abnormal. (e.g., power supply interruptions, instantaneous power failure, and so on)

Here, as an example of a conventional technology related to the above description, there is U.S. Pat. No. 6,188,192 B1 specification.

After the power supply applied from the host computer is cut off, during the above-mentioned power off retract, the power supply is continued to a voice coil motor and the like for driving the magnetic head by using a phase voltage generated during idling of a spindle motor (generally, 3-phase brushless DC motor) which keeps rotary drive of the platter so far. The power supply from the spindle motor to the voice coil motor need to be continued until an evacuation of the magnetic head is completed at least. Therefore it is important to reduce unnecessary energy loss.

SUMMARY OF THE INVENTION

In the light of the above problem found by the inventor of the present application, at least an embodiment of the present invention provides a motor drive device that is able to reduce energy loss when a power supply is applied to each device using a phase voltage generated during idling of a motor; a magnetic disk storage device and an electronic apparatus that use the motor drive device.

To achieve the above, a motor drive device disclosed in the present specification has a power supply line to which a power supply voltage is applied; a ground line to which a ground voltage is applied; and a first motor driver that, when the power supply voltage is normal, rotates an N-phase first motor (where N is an integer of 2 or more) by using the supply voltage and, when the power supply voltage is abnormal, generates a rectified voltage from phase voltages of different phases appearing while the first motor is idling to regenerate the rectified voltage to the power supply line, wherein the first motor driver, when generating the rectified voltage, is structured so as to boost the rectified voltage by periodically repeating a brake cycle to make all the terminals of the different phases of the first motor conduct to the ground line and a boost cycle to rectify the phase voltages of the different phases synchronously while making at least one of the terminals of the different phases conduct to the power supply line.

Here, other features, elements, steps, advantages and characteristics of the invention disclosed in the specification will become more apparent from the following detailed description of preferred embodiments and the attached drawings.

DETAILED DESCRIPTION OF PREFERRED EMBODIMENTS

<Motor Drive Device>

Figure 1:
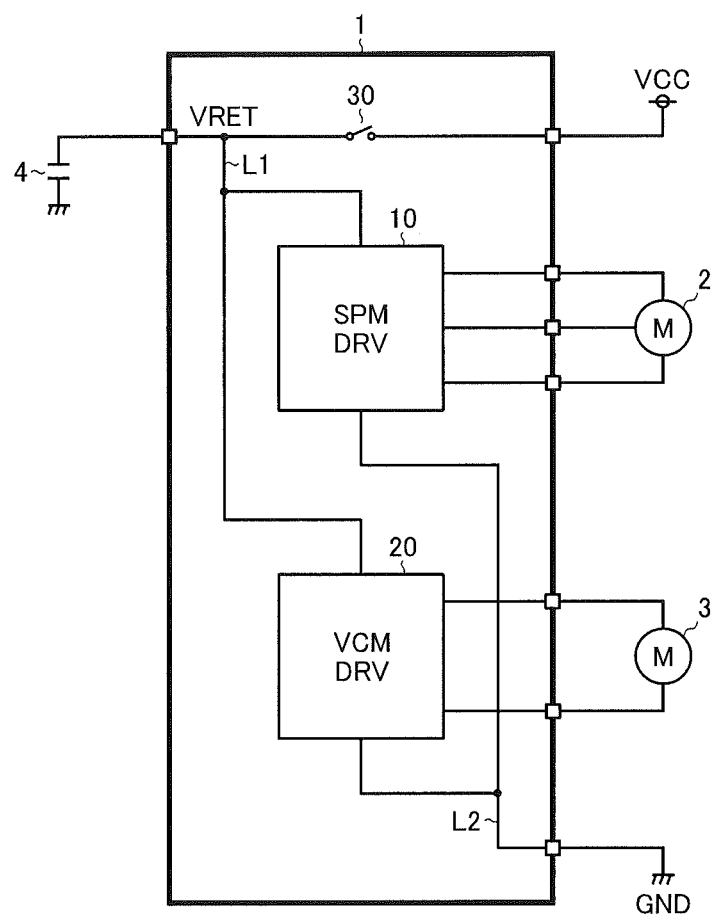
FIG. 1 is a block diagram showing a structural example of a motor drive device.

FIG. 1 is a block diagram for showing a structural example of a motor drive device. A motor drive device 1 in the present structural example is a monolithic semiconductor integrated circuit device (i.e., a system motor driver IC) to perform drive control of a spindle motor 2 and voice coil motor 3 used in a hard disk drive, and has: a spindle motor driver 10; a voice coil motor driver 20; an insulation switch 30; a power supply line L1; and a ground line L2. Here, the whole structure of the hard disk drive that incorporates the motor drive device 1 are illustrated below in detail.

The spindle motor driver 10 is connected in series between the power supply line L1 and the ground line L2, and rotates a platter (a magnetic disk) at predetermined rotation speeds by rotating the spindle motor 2 (e.g., a 3-phase brushless DC motor in the present structural example) with the power supply voltage VCC when the power supply voltage VCC is provided normally from a host computer of external device to the power supply line L1. On the other hand, the spindle motor driver 10 generates a rectified voltage VRET from the phase voltages SPA to SPC of the different phases generated during idling of a spindle motor 2, and reregulates the rectified voltage VRET to the power supply line L1 when the power supply voltage VCC is abnormal (e.g., power supply interruptions, instantaneous power failure, and so on). The rectified voltage VRET is provided for relevant parts (e.g., the voice coil motor 20 etc.) of the motor drive device 1 via the power supply line L1.

The voice coil motor driver 20 is connected in series between the power supply line L1 and the ground line L2, and moves the magnetic head on the platter in a tracking mode by driving the voice coil motor 2 with the power supply voltage VCC when the power supply voltage VCC is normal. On the other hand, the voice coil motor driver 20 operates the magnetic head automatically to an outside lamp mechanism further than an outermost circumference of the platter by driving the voice coil motor 20 with the rectified voltage VRET regenerating from the spindle motor driver 10 to the power supply line L1 when the power supply voltage is abnormal. A collision between the magnetic head and the platter is avoidable in advance by possessing such a power off retract function when the power supply voltage is abnormal.

The insulation switch 30 is an anti-reverse-current element to conduct/disconnect a power supply pin (an external terminal to provide the power supply voltage VCC) of the motor driver 1 and the power supply line L1 to and from each other. The insulation switch 30 turns on when the power supply voltage VCC is normal, and turns off when the power supply voltage VCC is abnormal. A MOS (metal oxide semiconductor) field effect transistor and a diode and the like are preferably usable as the insulation switch 30.

The power supply line L1 is a conductive member (a metal wiring) to which the power supply voltage VCC and the rectified voltage VRET are applied. Here, a capacitor 4 for rectifying the voltage is provided in the form of an external component to the power supply line L1.

The ground line L2 is a conductive member (a metal wiring) to which the ground voltage GND are applied.

<Spindle Motor Driver>

Figure 2:
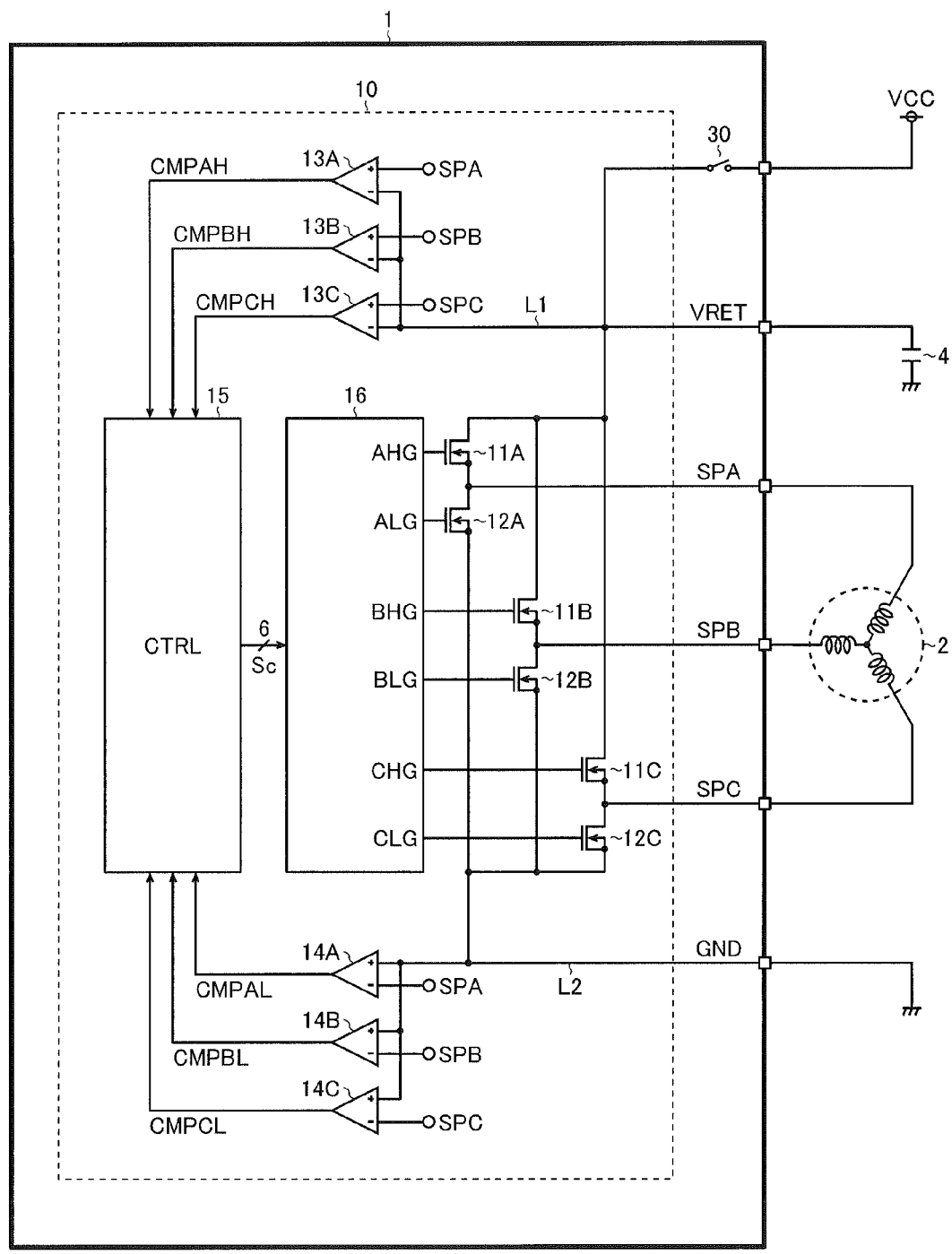
FIG. 2 is a block diagram for showing a structural example of a spindle motor driver 10.

FIG. 2 is a block diagram for showing a structural example of a spindle motor driver 10. The spindle motor driver 10 includes upper side switches 11x (where x=A,B,C; the same below), lower side switches 12x, upper side comparators 13x, lower side comparators 14x, a control unit 15, and pre-driver unit 16.

The upper switches 11x are switch elements (N-channel type MOS field effect transistor) to conduct/disconnect different phase terminals of the spindle motor 2 and the power supply line L1 to and from each other. The upper switches 11x turn on when upper side gate signals xHG are at a high level, and turn off when the upper side gate signals xHG are at a low level. Here, a P-channel type MOS field effect transistor is also usable as the upper side switches 11x.

The lower switches 12x are switch elements (N-channel type MOS field effect transistors) to conduct/disconnect the different phase terminals of the spindle motor 2 and the ground line L2 to and from each other. The lower switches 12x turn on when lower side gate signals xLG are at a high level, and turn off when the lower side gate signals xLG are at a low level.

The upper side comparators 13x generate upper comparison signals CMPxH by comparing the rectified voltage VRET with phase voltages SPx that appears to different phase terminals of the spindle motor 2. The upper side comparison signals CMPxH are at a high level when the rectified voltage is lower than the phase voltages SPx, and are at a low level when the rectified voltage is higher than the phase voltages SPx.

The lower side comparators 14x generate lower comparison signals CMPxL by comparing the ground voltage GND with phase voltages SPx. The lower side comparison signals CMPxL are at a high level when the ground voltage GND is higher than the phase voltages SPx, and are at a low level when the ground voltage GND is lower than the phase voltages SPx.

The control unit 15 generates a switch control signal Sc (upper side 3-phase and lower side 3-phase, a total of 6 channels) so as to rotate the spindle motor 2 at predetermined rotation speeds when the power supply voltage VCC is normal. On the other hand, the control unit 15 generates the switch control signal Sc in accordance with the upper side comparison signals CMPxH and the lower side comparison signals CMPxL when the power supply voltage VCC is abnormal. Here, operation of the control unit 15 is described in detail later.

Pre-driver 16 generates the upper side gate signals xHG and the lower side gate signals xLG so as to turn on/off the upper side switches 11x and the lower side switches 12x in accordance with the switch control signal Sc input from the control unit 15.

Figure 3:
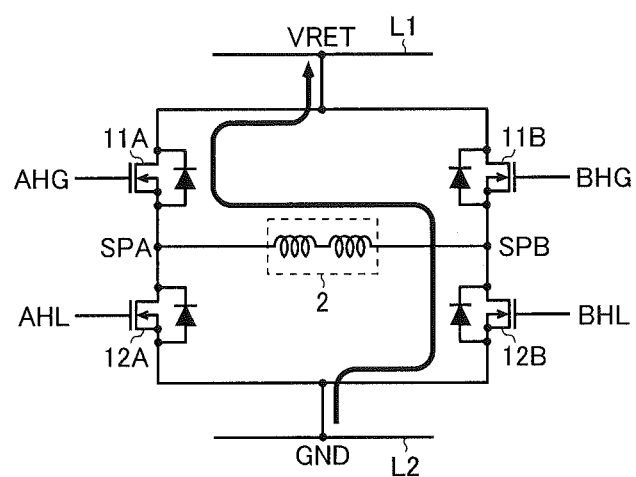
FIG. 3 is a schematic diagram for showing a state in a regenerative current flowing toward a power supply line L1.

FIG. 3 is a schematic diagram for showing a state in a regenerative current flowing from the ground line L2 toward the power supply line L1 via an output stage of the spindle motor driver 10 when the power supply voltage VCC is abnormal. In the figure, it is described that the regenerative current flows through a current path (L2→12B→2→11A→L1) showed by a thick arrow while the phase voltage SPA of an A-phase is higher than the phase voltage SPB of a B-phase.

In the above-mentioned case, because the regenerated current flows via each of body diodes that is parasitic on the upper side switch 11A and lower side switch 12B, energy loss (energy loss=2*Vf) of a forward voltage drop produced by each of the body diode is caused if both the upper side switch 11A and the lower side switch 12B turn off.

In order to reduce the above-mentioned energy loss, it is necessary to optimize synchronous rectification operation with the phase voltage SPx by performing switching control of spindle motor driver 10 properly. For example, in the conventional motor drive device, a state in the synchronous rectification of the output stage (the switch which is turned on) is determined in accordance with the results of the comparison between the phase voltages SPx of the different phases mutually. However, in such a conventional method, the synchronous rectification operation with the phase voltages SPx can't be always optimized because two upper side switches can't be turned on at the same time or two lower side switches can't be turned on at the same time.

<Synchronous Rectification Operation>

Figure 4:
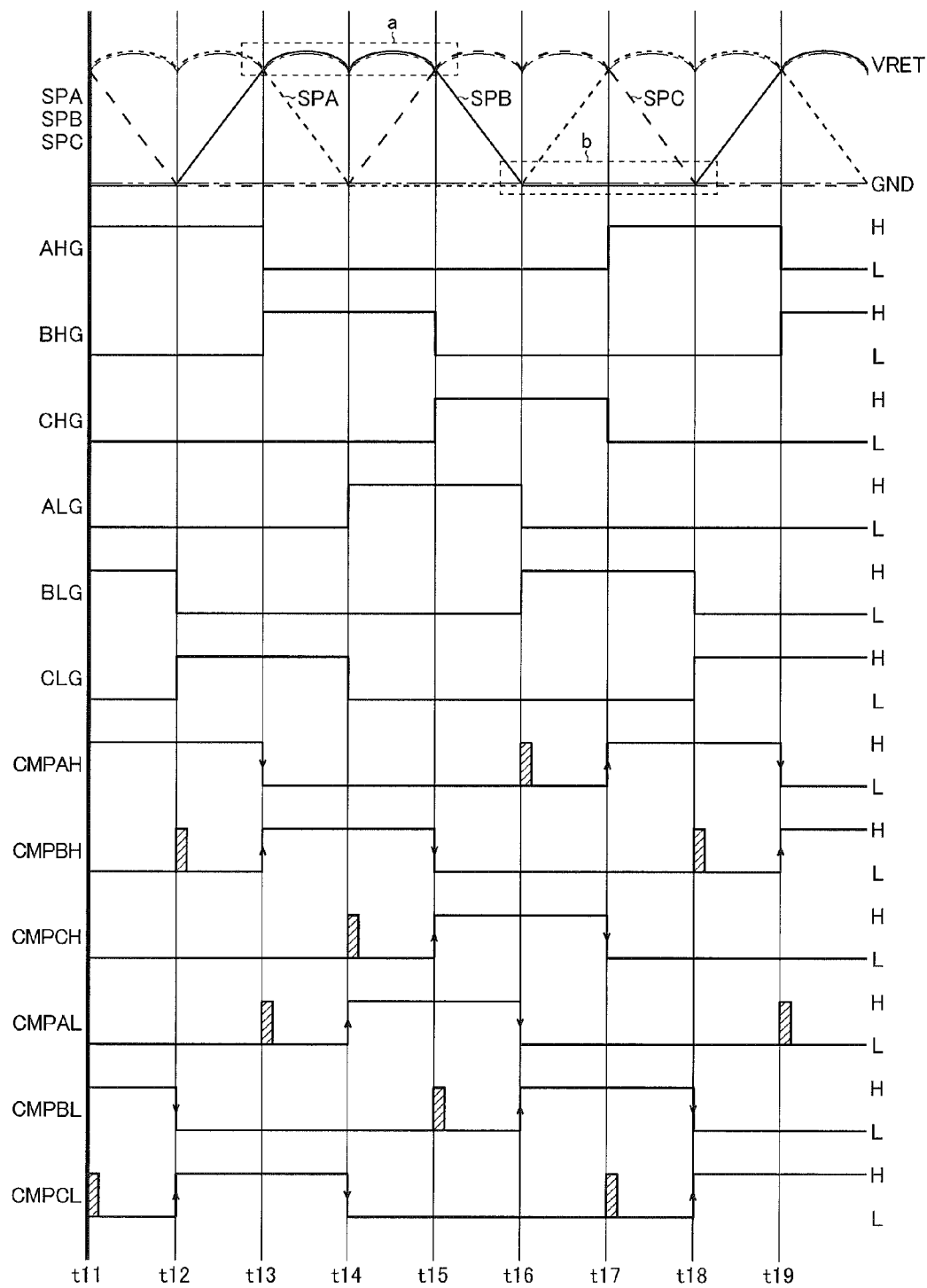
FIG. 4 is a timing chart for showing an example of synchronous rectification operation.

FIG. 4 is a timing chart for showing an example of synchronous rectification operation by the spindle motor driver 10. FIG. 4 shows the phase voltages SPx (The phase voltages SPx are described with the rectified voltage VRET and the ground voltage GND.), the upper side gate signals xHG, the lower side gate signals xLG, the upper side comparison signals CMPxH, and the lower side comparison signals CPMxL in order from top. Here, in FIG. 4, it is supposed that the time passes in order of times t11 to t19.

In the times t11 to t12, the upper side gate signal AHG and the lower side gate signal ALG are at a high level, and any of the other gate signals are at a low level. In this case, the regenerated current mainly flows to the output stage of the spindle motor driver 10 in the first path (L2→12B→2→11A→L1). Besides, a voltage value of the rectified voltage VRET (a chain line) depends on a voltage value of the phase voltage SPA (a small dashed line).

In the times t12 to t13, the upper side gate signal AHG and the lower side gate signal CLG are at the high level, and any of the other gate signals are at the low level. In this case, the regenerated current mainly flows to the output stage of the spindle motor driver 10 in the second path (L2→12C→2→11A→L1), and a capacitor 4 is charged. Besides, the voltage value of the rectified voltage VRET depends on the voltage value of the phase voltage SPA.

In the times t13 to t14, the upper side gate signal BHG and the lower side gate signal CLG are at the high level, and any of the other gate signals are at the low level. In this case, the regenerated current mainly flows to the output stage of the spindle motor driver 10 in the third path (L2→12C→2→11B→L1), and the capacitor 4 is charged. Besides, the voltage value of the rectified voltage VRET depends on a voltage value of the phase voltage SPB (a solid line).

In the times t14 to t15, the upper side gate signal BHG and the lower side gate signal ALG are at the high level, and any of the other gate signals are at the low level. In this case, the regenerated current mainly flows to the output stage of the spindle motor driver 10 in the fourth path (L2→12A→2→11B→L1), and the capacitor 4 is charged. Besides, the voltage value of the rectified voltage VRET depends on the voltage value of the phase voltage SPB.

In the times t15 to t16, the upper side gate signal CHG and the lower side gate signal ALG are at the high level, and any of the other gate signals are at the low level. In this case, the regenerated current mainly flows to the output stage of the spindle motor driver 10 in the fifth path (L2→12A→2→11C→L1), and the capacitor 4 is charged. Besides, the voltage value of the rectified voltage VRET depends on a voltage value of the phase voltage SPC (a big dashed line).

In the times t16 to t17, the upper side gate signal CHG and the lower side gate signal BLG are at the high level, and any of the other gate signals are at the low level. In this case, the regenerated current mainly flows to the output stage of the spindle motor driver 10 in the sixth path (L2→12B→2→11C→L1), and the capacitor 4 is charged. Besides, the voltage value of the rectified voltage VRET depends on the voltage value of the phase voltage SPC.

After time t17, the above-mentioned operation is basically repeated, and the rectified voltage VRET is generated.

Here, the spindle motor driver 10 determines a synchronous rectification state of the output stage in accordance with not the results of the mutual comparison between the phase voltage SPx of the different phases but the result of the comparison between the phase voltage SPx of the different phases, the rectified voltage VRET, and the ground voltage GND, when the above-mentioned rectified voltage VRET is generated.

More specifically, the control unit 15 generates the switch control signal Sc so as to turn on the upper side switches 11x of the phases with the phase voltages SPx higher than the rectified voltage VRET (i.e., the phases in which the upper side comparison signals CMPxH are at a high level), and so as to turn off the upper side switches 11x of the phases with the phase voltages SPx lower than the rectified voltage VRET (i.e., the phases in which the upper side comparison signals CMPxH are at a low level). In other words, the control unit 15 generates the switch control signal Sc so as to turn on the upper side switches 11x of the different phases in which the current flows from the spindle motor 2 toward the power supply line L1, and so as to turn off the upper side switches 11x of different the phases in which the current flows from the power supply line L1 toward the spindle motor 2 to the contrary.

Besides, the control unit 15 generates the switch control signal Sc so as to turn on the lower side switches 12x of the phases with the phase voltages SPx lower than the ground voltage GND (i.e., the phases in which the lower side comparison signals CMPxL are at a high level), and so as to turn off the lower side switches 12x of the phases with the phase voltages SPx higher than the ground voltage GND (i.e., the phases in which the lower side comparison signals CMPxL are at a low level). In other words, the control unit 15 generates the switch control signal Sc so as to turn on the lower side switches 12x of the different phases in which the current flows from the ground line L2 toward the spindle motor 2, and so as to turn off the lower side switches 12x of the different phases in which the current flows from the spindle motor toward 2 the ground line L2 to the contrary.

As the above description, the spindle motor driver 10 has six upper side comparators 13x and lower side comparators 14x in all. The spindle motor driver 10 separately turns on and off six upper side switches 11x and lower side switches 12x in all in accordance with each detection result.

According to such a synchronous rectification power management system, the phases for the synchronous rectification operation can be switched at appropriate timing in accordance with directions of the currents that flow to the six upper side switches 11x and lower side switches 12x in all respectively. In addition, the upper side switches 11x of the two phases are possible to be turned on at the same time or the lower side switches 12x of the two phases are possible to be turned on at the same time (see FIG. 7 and FIG. 8) as necessary. Therefore it is possible to reduce the energy loss during the synchronous rectification operation in comparison with a conventional method that compares the phase voltages SPx of the different phases mutually because the regenerative current efficiently flows toward the power supply voltage L1 without operating the body diodes related to each of the upper side transistors 11x and the lower side transistors 12x as active as possible.

Besides, in the spindle motor driver 10, the control unit 15 ignores the upper side comparison signals CMPxH and the lower comparison signals CMPxL of the different phases during a predetermined mask term (refer to a hatching term in FIG. 4) when switching the phases.

More specifically, when a lower side switch 12x of one phase is turned off, the control unit 15 ignores an upper side comparison signal CMPxH of the phase (refer to times t12, t14, t16, and t18). Besides, when a upper side switch 11x of one phase is turned off, the control unit 15 ignores a lower side comparison signal CMPxL of the phase (refer to times t11, t13, t15, t17, and t19).

According to such structure, it is possible to ignore a surge voltage of the spindle motor 2 that is generated when switching the phases, and to prevent a malfunction of the synchronous rectification.

Besides, in the spindle motor driver 10, each of the upper side comparators 13x and the lower side comparators 14x uses a hysteresis comparator. According to such structure, it is possible to prevent a malfunction caused by chattering and the like of the upper side comparators 13x and the lower side comparators 14x, if a voltage difference between the rectified voltage VRET and the phase voltages SPx or a voltage difference between the ground voltage GND and the phase voltage SPx becomes small.

Figure 5:
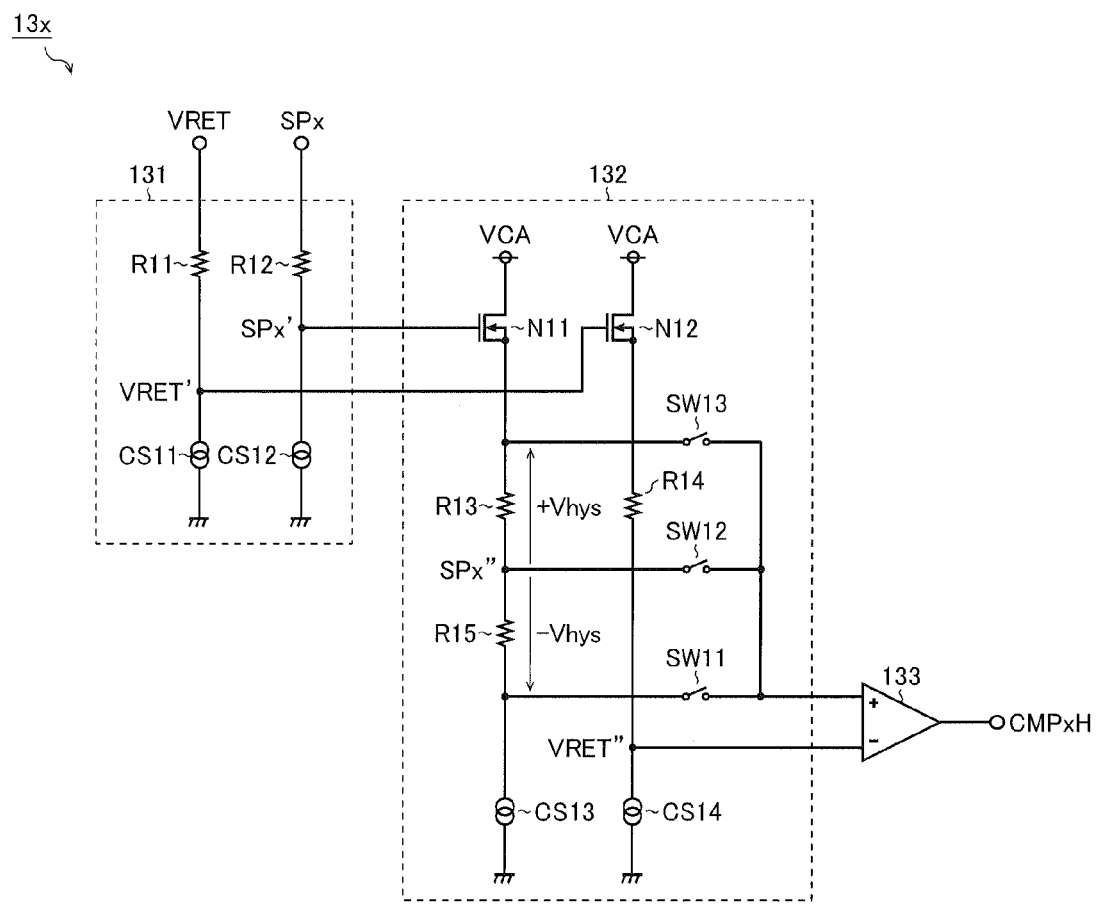
FIG. 5 is a circuit diagram for showing a first structural example of upper side comparators 13x.

FIG. 5 is a circuit diagram for showing a first structural example of upper side comparators 13x. The upper side comparators 13x of the first structural example include a voltage input portion 131, a hysteresis control unit 132, and a voltage comparison unit 133. In addition, the upper side comparators 13x have a function for switching a hysteresis voltage Vhys that is contained to either the rectified voltage VRET or the phase voltages SPx.

The voltage input portion 131 is a circuit block for receiving the rectified voltage VRET and the phase voltage SPx. The voltage input portion 131 includes resistors R11 and R12, and current sources CS11 and CS12. A first terminal of the resistor R11 is connected to an application terminal of the rectified voltage VRET. A second terminal is connected to an application terminal of the ground terminal GND via the current source CS11. A first terminal of the resistor R12 is connected to an application terminal of the phase voltage SPx. A second terminal of the resistor R12 is connected to the ground terminal GND via the current source CS 12.

The voltage input portion 131 having the above structure generates a level-shifted rectified voltage VRET' and a level-shifted phase voltage SPx' by reducing the rectified voltage VRET and the phase voltage SPx respectively. In addition, the voltage input portion 131 transmits the level-shifted rectified voltage VRET' and the level-shifted phase voltage SPx' to the hysteresis control unit 132. As described above, if the hysteresis unit 132 has a function for a level shift, an unnecessary improvement of a break down voltage is avoided to the hysteresis control unit 132.

The hysteresis control unit 132 generates a level-shifted rectified voltage VRET" and a level-shifted phase voltage SPx" by reducing the rectified voltage VRET' and the phase voltage SPx' respectively applied via the voltage input portion 131. The hysteresis control unit 132 is a circuit block for containing the hysteresis voltage Vhys to either the rectified voltage VRET" or the phase voltage SPx" (In FIG. 5, the phase voltage SPx" is shown as an example.), and the hysteresis control unit 132 includes N-channel type MOS field effect transistors N11 and N12, resistors R13 to R15, source voltages CS13 and CS14, and switches SW11 to SW13.

A drain of the transistor N11 is connected to an application terminal of an internal voltage VCA (a constant voltage generated by step-down of the power supply voltage VCC or the rectified voltage VRET). Both a source and a back gate of the transistor N11 are connected to a first terminal of the resistor R13 and a first terminal of the switch SW13. A gate of the transistor N11 is connected to an application terminal of the phase voltage SPx'. A drain of the transistor N12 is connected to the application terminal of the internal voltage VCA. Both a source and a back gate of the transistor N12 are connected to a first terminal of the resistor R1. A gate of the transistor N12 is connected to an application terminal of the rectified voltage VRET'. A second terminal of the resistor R13 is connected to a first terminal of the resistor R15 and a first terminal of the switch SW12. A second terminal of the resistor 15 is connected to an application terminal of the ground voltage GND via the current source C13, while is connected to a first terminal of the switch SW11. A second terminal of the resistor R14 is connected to the application terminal of the ground voltage GND via the current source 14, while is connected to an inverting input terminal (−) of the voltage comparison unit 133. Second terminals of the switches SW11 to SW13 are connected in common with a non-inverting input terminal (+) of the voltage comparison unit 133.

The switches SW11 to SW13 are alternatively turned on by the control unit 15. When the switch 11 is turned on, a voltage (=SPx"−Vhys) that subtracts the hysteresis voltage Vhys from the phase voltage SPx" is transmitted to the voltage comparison unit 133. When the switch 12 is turned on, the phase voltage SPx" itself is transmitted to the voltage comparison unit 133. When the switch 13 is turned on, a voltage (=SPx"+Vhys) that adds the hysteresis voltage Vhys to the phase voltage SPx" is transmitted to the voltage comparison unit 133. Here, switching control (control for turning on and off the switches SW11 to SW13) of the hysteresis voltage Vhys is described in detail later.

The voltage comparison unit 133 is a circuit block for generating the upper side comparison signal CMPxH by comparison between the rectified voltage VRET" and the phase voltage SPx". Both the rectified voltage VRET" and the phase voltage SPx" are applied via the hysteresis control unit 132.

The upper side comparison signal CMPxH is at a high level when the rectified voltage VRET" is lower than the phase voltage SPx". To the contrary, the upper side comparison signal CMPxH is at a low level when the rectified voltage VRET" is higher than the phase voltage SPx".

Figure 6:
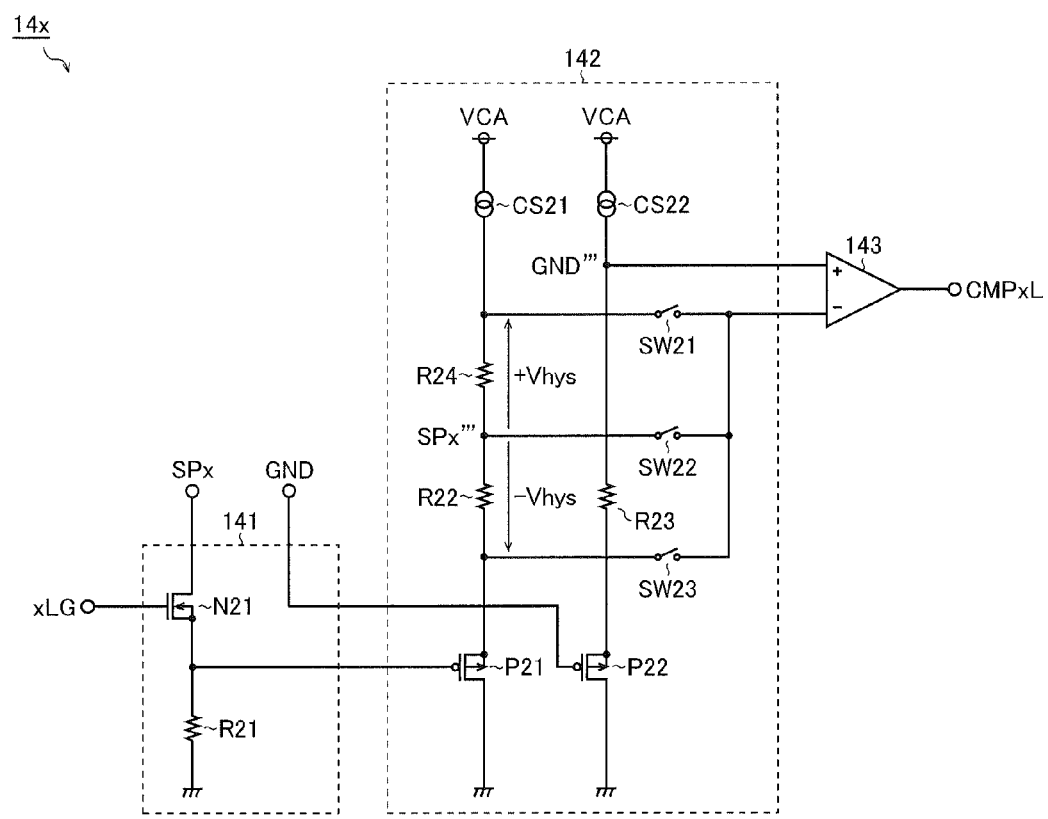
FIG. 6 is a circuit diagram for showing a first structural example of lower side comparators 14x.

FIG. 6 is a circuit diagram for showing a first structural example of lower side comparators 14x. The lower comparators 14x of the first structural example include a voltage input portion 141, hysteresis control unit 142, and a voltage comparison unit 143. In addition, the lower side comparators 14x have a function for switching a hysteresis voltage Vhys that is contained to either the ground voltage GND or the phase voltage SPx.

The voltage input portion 141 is a circuit block for receiving the ground voltage GND and the phase voltage SPx. The voltage input portion 141 includes an N-channel type MOS field effect transistor N21 and resistor R21. A drain of the transistor N21 is connected to an application terminal of the phase voltage SPx. Both a source and a back gate of the transistor N21 are connected to a first terminal of the resistor R21, while are connected to a first input terminal (a gate of a transistor P21 described later) of the hysteresis control unit 142. A second terminal of the resistor R21 is connected to an application of the ground voltage GND. A gate of the transistor N21 is connected to an application of a lower side gate signal xLG. The application terminal of the ground voltage GND is connected to a second input terminal (a gate of a transistor P22 described later) of the hysteresis control unit 142.

The voltage input portion 131 having the above structure receives the rectified voltage VRET by turning on the transistor N21, only when the lower side switch 12x of the corresponding phase is turned on (in other words, when the lower side gate signal xLG is at the high level). According to such structure, an unnecessary improvement of a break down voltage is avoided to the hysteresis control unit 142. Here, the transistor N21 may be always turned on by always applying the high level voltage (e.g., internal voltage VCA) to the gate of the transistor N21.

The hysteresis control unit 142 generates a level-shifted ground voltage GND''' and a level-shifted phase voltage SPx''' by raising the ground voltage GND and the phase voltage SPx respectively applied via the voltage input portion 141. The hysteresis control unit 142 is a circuit block for containing the hysteresis voltage Vhys to either the level-shifted ground voltage GND''' or the level-shifted phase voltage SPx''' (In FIG. 6, the phase voltage SPx''' is shown as an example.), and the hysteresis control unit 142 includes P-channel type MOS field effect transistors P21 and P22, resistors R22 to R24, source voltages CS21 and CS22, and switches SW21 to SW23.

A drain of the transistor P21 is connected to the application terminal the ground voltage GND. Both a source and a back gate of the transistor P21 are connected to a first terminal of the resistor R22 and a first terminal of the switch SW23. A gate of the transistor P21 is connected to the application terminal of the phase voltage Spx via the transistor N21. A drain of the transistor P22 is connected to the application terminal the ground voltage GND. Both a source and a back gate of the transistor P22 are connected to a first terminal of the resistor R23. A gate of the transistor P22 is connected to the application terminal of the ground voltage GND. A second terminal of the resistor R22 is connected to a first terminal of the resistor R24 and a first terminal of the switch SW22. A second terminal of the resistor R24 is the application terminal of the internal voltage VCA via the current source CS21, while is connected a first terminal of the switch SW21. A second terminal of the resistor R23 is connected to the application terminal of the internal voltage VCA via the current source CS22, while is connected to a non-inverting input terminal (+) of the voltage comparison unit 143. Second terminals of the switches SW21 to SW23 are connected in common with an inverting input terminal (−) of the voltage comparison unit 143.

The switches SW21 to SW23 are alternatively turned on by the control unit 15. When the switch 21 is turned on, a voltage (=SPx'''+Vhys) that adds the hysteresis voltage Vhys to the phase voltage SPx''' is transmitted to the voltage comparison unit 143. When the switch 22 is turned on, the phase voltage SPx''' itself is transmitted to the voltage comparison unit 143. When the switch 23 is turned on, a voltage (=SPx'''−Vhys) that subtracts the hysteresis voltage Vhys from the phase voltage SPx''' is transmitted to the voltage comparison unit 143. Here, switching control (control for turning on and off the switches SW21 to SW23) of the hysteresis voltage Vhys is described in detail later.

The voltage comparison unit 143 is a circuit block for generating the lower side comparison signal CMPxL by comparison between the ground voltage GND''' and the phase voltage SPx'''. Both the ground voltage GND''' and the phase voltage SPx''' are applied via the hysteresis control unit 142. The lower side comparison signal CMPxL is at a high level when the ground voltage GND''' is lower than the phase voltage SPx'''. To the contrary, the lower side comparison signal CMPxL is at a low level when the ground voltage GND''' is higher than the phase voltage SPx'''.

Figure 7:
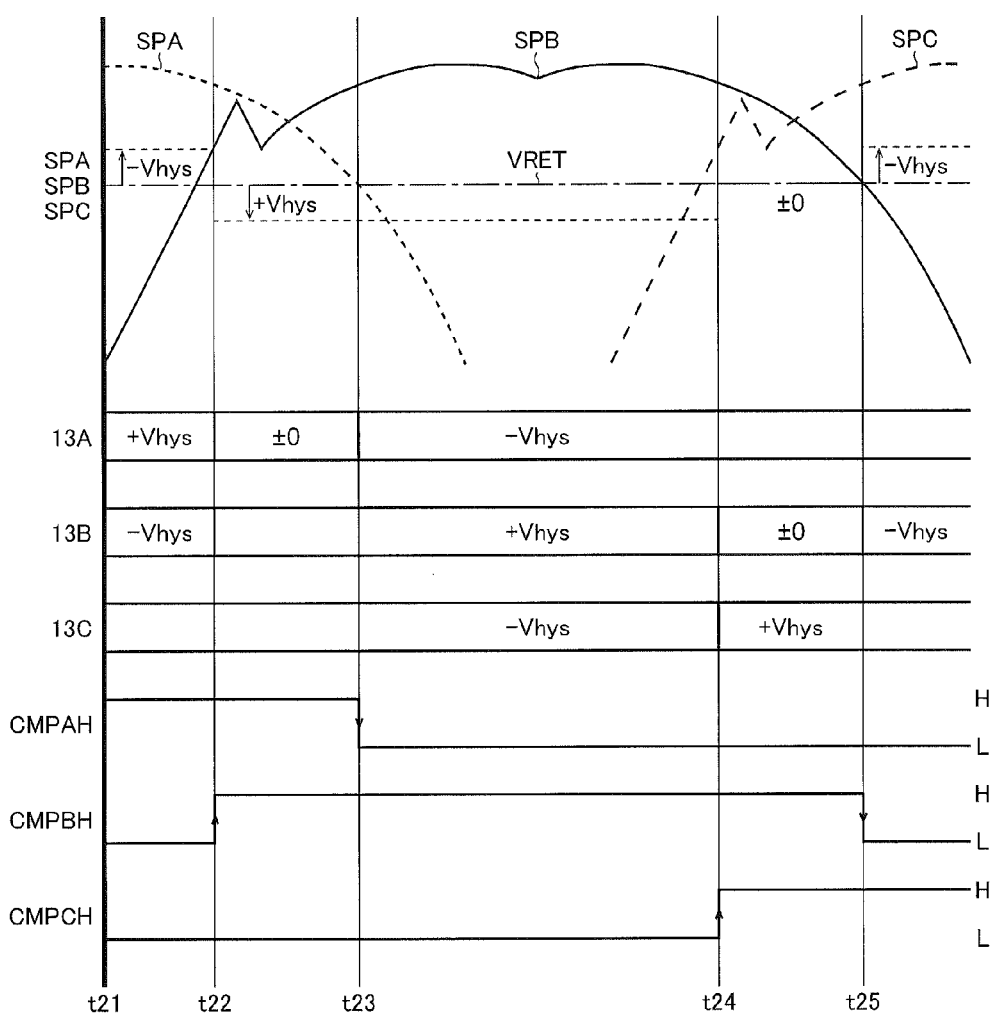
FIG. 7 is a timing chart for showing hysteresis control of upper side comparators 13x.

FIG. 7 is a timing chart (an enlargement of a region "a" in FIG. 4) for showing hysteresis control of upper side comparators 13x. FIG. 7 shows the phase voltages SPx (The phase voltages SPx are described with the rectified voltage VRET.), the hysteresis voltage Vhys in the upper side comparators 13x, and the upper side comparison signals CMPxH in order from top. Here, in FIG. 7, it is supposed that the time passes in order of times t21 to t25.

In the times t21 to t22, an upper side switch 11A is turned on, and the regenerated current flows from the A-phase of the spindle motor 2 toward the power supply line L1. In this case, the switch SW11 is turned on in an upper side comparator 13B, and the hysteresis voltage Vhys is set to a negative value. Therefore an upper side comparison signal CMPBH holds a low level until "SPB−Vhys>VRET" is satisfied.

In the time t22, an upper side switch 11B is turned on when "SPB−Vhys>VRET" is satisfied and the upper side comparison signal CMPBH rises to a high level. In the times t22 to t23, consequently, the regenerated current flows from the A-phase and the B-phase of the spindle motor 2 toward the power supply line L1. Besides, when the upper side comparison signal CMPBH rises to the high level, the switch SW13 is turned on instead of the switch SW11 in the upper side comparator 13B, and the hysteresis voltage Vhys changes from a negative value into a positive value. Therefore the upper side comparison signal CMPBH holds the high level until "SPB+Vhys<VRET" is satisfied.

In the time t23, the upper side switch 11A is turned off when "SPA<VRET" is satisfied and the upper side comparison signal CMPAH falls to the low level. In the times t23 to t24, consequently, the regenerated current flows from the B-phase of the spindle motor 2 toward the power supply line L1.

In the time t24, an upper side switch 11C is turned on when "SPC−Vhys>VRET" is satisfied and an upper side comparison signal CMPCH rises to a high level. In the times t24 to t25, consequently, the regenerated current flows from the B-phase and a C-phase of the spindle motor 2 toward the power supply line L1. Besides, when the comparison signal CMPCH rises to the high level, the switch SW12 is turned on instead of the switch SW13 in the upper side comparator 13B, and the hysteresis voltage Vhys changes into zero. Therefore the upper side comparison signal CMPBH holds the high level until "SPB<VRET" is satisfied.

In the time t25, the upper side switch 11B is turned off when "SPB<VRET" is satisfied and the upper side comparison signal CMPBH falls to the low level. After the time t25, consequently, the regenerated current flows from the C-phase of the spindle motor 2 toward the power supply line L1. Besides, when the upper side comparison signal CMPBH falls to the low level, the switch SW11 is turned on instead of the switch SW12 in the upper side comparator 13B, and the hysteresis voltage Vhys changes from zero into a negative value. Therefore the upper side comparison signal CMPBH holds the low level until "SPB−Vhys>VRET" is satisfied. After the time t25, the operation similar to the times t21 to t25 is repeated.

As the above description, the upper side comparator 13B changes the hysteresis voltage Vhys into the positive value or the negative value in accordance with the upper side comparison signal CMPBH. The upper side comparator 13B also changes the hysteresis voltage Vhys into zero in accordance with the upper side comparison signal CMPCH (or the upper side comparison signal CMPAH). According to such structure, a malfunction that is caused by noise is prevented by big change of the hysteresis voltage from the negative value into the positive value when the upper side switch 11B is turned on, and it is possible to switch the phase of the synchronous rectification at a primary timing by restoring the hysteresis voltage Vhys to zero in advance when the upper side switch 11B is turned off.

Supplementary description will be given about significance for restoring the hysteresis voltage Vhys to zero by the timing when the upper side switch 11B is turned off. If the positive value is continuously held without restoring the hysteresis voltage Vhys to zero at the time t24, the timing when the upper side switch 11B is turned off is delayed. Efficiency is consequently reduced because the current is drawn from the power supply line L1 toward the spindle motor 2. To the contrary, if the hysteresis voltage Vhys changes into the negative voltage at the time t24, the timing when the upper side switch 11B is turned off is advanced. Efficiency is consequently reduced because the regenerated current flows via the body diode which is parasitic on the upper side switch 11B. For this reason, it is advisable to restore the hysteresis voltage Vhys to zero by the timing when the upper side switch 11B is turn off.

Here, the timing for restoring the hysteresis voltage Vhys to zero isn't always at the rising timing (the time 24) of the upper side comparison signal CMPCH. For example, the timing for restoring the hysteresis voltage Vhys to zero may be at the falling timing (the time 23) of the upper side comparison signal CMPAH. However, it is advisable to restore the hysteresis voltage Vhys to zero at the time t24 because noise immunity during the time t23 to t24 makes worse when restoring the hysteresis voltage Vhys to zero at the time t23.

Besides, as mentioned above, the detailed description is mainly given with a focus on the operation of the phase voltage SPB or the upper side comparator 13B. The description similar to the above is also applied by shifting the above-mentioned phase to ±120 degrees in case of focusing on the operation of the phase voltages SPA and SPC or the upper side comparators 13A and 13C.

Figure 8:
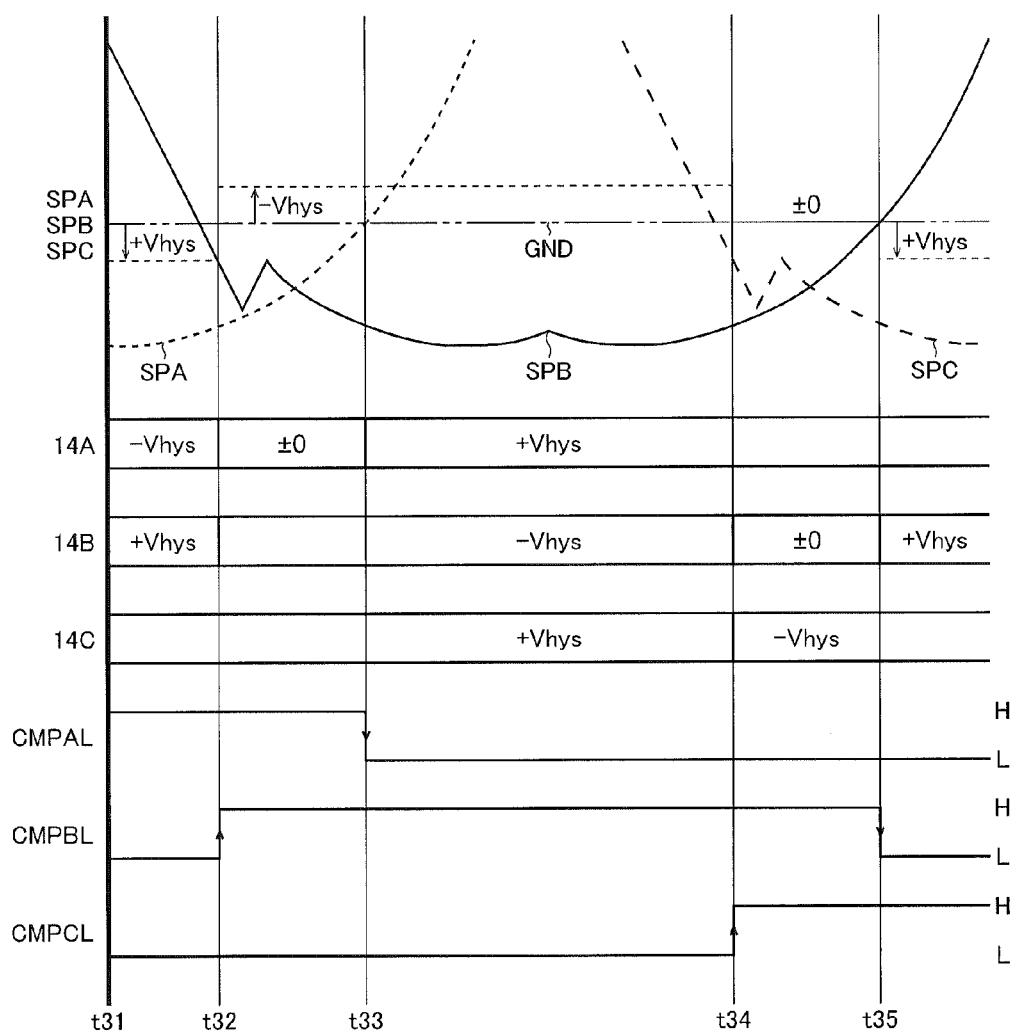
FIG. 8 is a timing chart for showing hysteresis control of lower side comparators 14x.

FIG. 8 is a timing chart (an enlargement of a region "b" in FIG. 4) for showing hysteresis control of lower side comparators 14x. FIG. 8 shows the phase voltages SPx (The phase voltages SPx are described with the ground voltage GND.), the hysteresis voltage Vhys in the lower side comparators 14x, and the lower side comparison signals CMPxL in order from top. Here, in FIG. 8, it is supposed that the time passes in order of times t31 to t35.

In the times t31 to t32, a lower side switch SW12A is turned on, and the regenerated current flows from the ground line L2 toward the A-phase of the spindle motor 2. In this case, the switch SW21 is turned on in a lower side comparator 14B, and the hysteresis voltage Vhys is set to a positive value. Therefore a lower side comparison signal CMPBL holds a low level until "SPB+Vhys<GND" is satisfied.

In the time t32, a lower side switch 12B is turned on when "SPB+Vhys<GND" is satisfied and the lower side comparison signal CMPBL rises to a high level. In the times t32 to t33, consequently, the regenerated current flows from the ground line L2 toward the A-phase and the B-phase of the spindle motor 2. Besides, when the lower side comparison signal CMPBL rises to the high level, the switch SW23 is turned on instead of the switch SW21 in the upper side comparator 14B, and the hysteresis voltage Vhys changes from a positive value into a negative value. Therefore the lower side comparison signal CMPBL holds the high level until "SPB−Vhys>GND" is satisfied.

In the time t33, the upper side switch 12A is turned off when "SPA>GND" is satisfied and the lower side comparison signal CMPAL falls to the low level. In the times t33 to t34, consequently, the regenerated current flows from the ground line L2 toward the B-phase of the spindle motor 2.

In the time t34, a lower side switch 12C is turned on when "SPC+Vhys<GND" is satisfied and a lower side comparison signal CMPCL rises to a high level. In the times t34 to t35, consequently, the regenerated current flows from the ground line L2 toward the B-phase and the C-phase of the spindle motor 2. Besides, when the comparison signal CMPCL rises to the high level, the switch SW22 is turned on instead of the switch SW23 in the lower side comparator 14B, and the hysteresis voltage Vhys changes into zero. Therefore the lower side comparison signal CMPBL holds the high level until "SPB>GND" is satisfied.

In the time t35, the lower side switch 12B is turned off when "SPB>GND" is satisfied and the lower side comparison signal CMPBL falls to the low level. After the time t35, consequently, the regenerated current flows from the ground line L2 toward the C-phase of the spindle motor 2. Besides, when the lower side comparison signal CMPBL falls to the low level, the switch SW21 is turned on instead of the switch SW22 in the lower side comparator 14B, and the hysteresis voltage Vhys changes from zero into a positive value. Therefore the lower side comparison signal CMPBL holds the low level until "SPB+Vhys<GND" is satisfied. After the time t35, the operation similar to the times t31 to t35 is repeated.

As the above description, the lower side comparator 14B changes the hysteresis voltage Vhys into the positive voltage or the negative voltage in accordance with the lower side comparison signal CMPBL. The upper side comparator 14B also changes the hysteresis voltage Vhys into zero in accordance with the lower side comparison signal CMPCL (or the lower side comparison signal CMPAL). According to such structure, a malfunction that is caused by noise is prevented by big change of the hysteresis voltage from the positive value into the negative value when the lower side switch 12B is turned on, and it is possible to switch the phase of the synchronous rectification at a primary timing by restoring the hysteresis voltage Vhys to zero in advance when the lower side switch 12B is turned off.

Supplementary description will be given about significance for restoring the hysteresis voltage Vhys to zero by the timing when the upper side switch 12B is turned off. If the negative value is continuously held without restoring the hysteresis voltage Vhys to zero at the time t34, the timing when the upper side switch 12B is turned off is delayed. Efficiency is consequently reduced because the current is drawn from the spindle motor 2 toward the ground line L2. To the contrary, if the hysteresis voltage Vhys changes into the positive voltage at the time t34, the timing when the lower side switch 12B is turned off is advanced. Efficiency is consequently reduced because the regenerated current flows via the body diode which is parasitic on the lower side switch 12B. For this reason, it is advisable to restore the hysteresis voltage Vhys to zero by the timing when the upper side switch 12B is turn off.

Here, the timing for restoring the hysteresis voltage Vhys to zero isn't always at the rising timing (the time 34) of the lower side comparison signal CMPCL. For example, the timing for restoring the hysteresis voltage Vhys to zero may be at the falling timing (the time 33) of the lower side comparison signal CMPAL. However, it is advisable to restore the hysteresis voltage Vhys to zero at the time t34 because noise immunity during the time t33 to 324 makes worse when restoring the hysteresis voltage Vhys to zero at the time t23.

Besides, as mentioned above, the detailed description is mainly given with a focus on the operation of the phase voltage SPB or the lower side comparator 14B. The description similar to the above is applied by shifting the above-mentioned phase to ±120 degrees in case of focusing on the operation of the phase voltages SPA and SPC or the upper side comparators 14A and 14C.

<Step-Up Synchronous Rectification Operation>

A voltage value of the rectified voltage VRET depend on a voltage value of the phase voltage SPx of the spindle motor 2. Therefore, in the above-mentioned synchronous rectification operation (FIG. 4), there are cases in which a desired rectified voltage VRET can't be generated when the voltage value of the phase voltage SPx is small. Hereinafter, a method (step-up synchronous rectification operation) of boosting the rectified voltage by using a brake current of the spindle motor 2 is proposed to obtain a still higher rectified voltage.

Here, in the spindle motor driver 10, it is advisable for users to be structured so as to be able to change optionally by external pins setting, resistors setting and the like as to whether to perform the synchronous rectification operation described earlier (FIG. 4) or to perform the step-up synchronous rectification operation (FIG. 9) described later.

Figure 9:
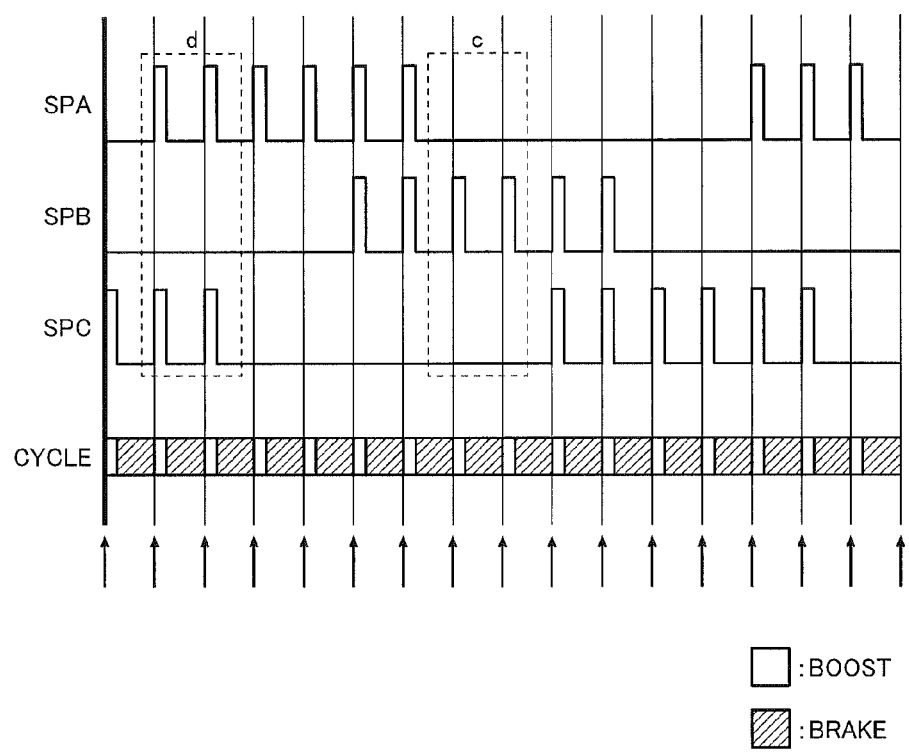
FIG. 9 is a timing chart for showing a structural example of step-up synchronous rectification operation.

FIG. 9 is a timing chart for showing a structural example of step-up synchronous rectification operation. FIG. 9 shows the phase voltage SPA, the phase voltage SPB, the phase voltage SPC, and an operation cycle (a brake cycle and a boost cycle).

When the rectified voltage VRET is generated by the synchronous rectification operation, the spindle motor driver 10 periodically repeats the brake cycle for conducting all of the phase terminals of the spindle motor 2 to the ground line L2 and the boost cycle for conducting at least one of each of the phase terminals to the power supply line L1 and for rectifying the phase voltages SPx of the different phases synchronically, thereby boosting the rectified voltage VRET. According to such a step-up synchronous rectification power management system, it is possible to generate the desired rectified voltage VRET even if the voltage values of the phase voltages SPx are low.

Here, in the above-mentioned boost cycle, the phase voltages SPx of the different phases are sine waves that shift each electrical angle by 120 degrees from one another. Therefore the lower side switches 12x need to be turned on in the phase where the current flows from the ground line L2 toward the spindle motor 2, and the upper side switches need to be turned on in the phase where the current flows from the spindle motor 2 toward the power supply line L1.

Then the spindle motor driver 10 detects the direction of the brake current flowing through between the spindle motor 2 and the ground line L2 during the brake cycle (especially, the timing immediately before switching to the boost cycle showed by up arrows in FIG. 9), and then determine a state (the switch which is turned on) of the synchronous rectification during the boost cycle in accordance with a detection result. Hereinafter, the cycle switching control is described in detail with concrete examples.

Figure 10:
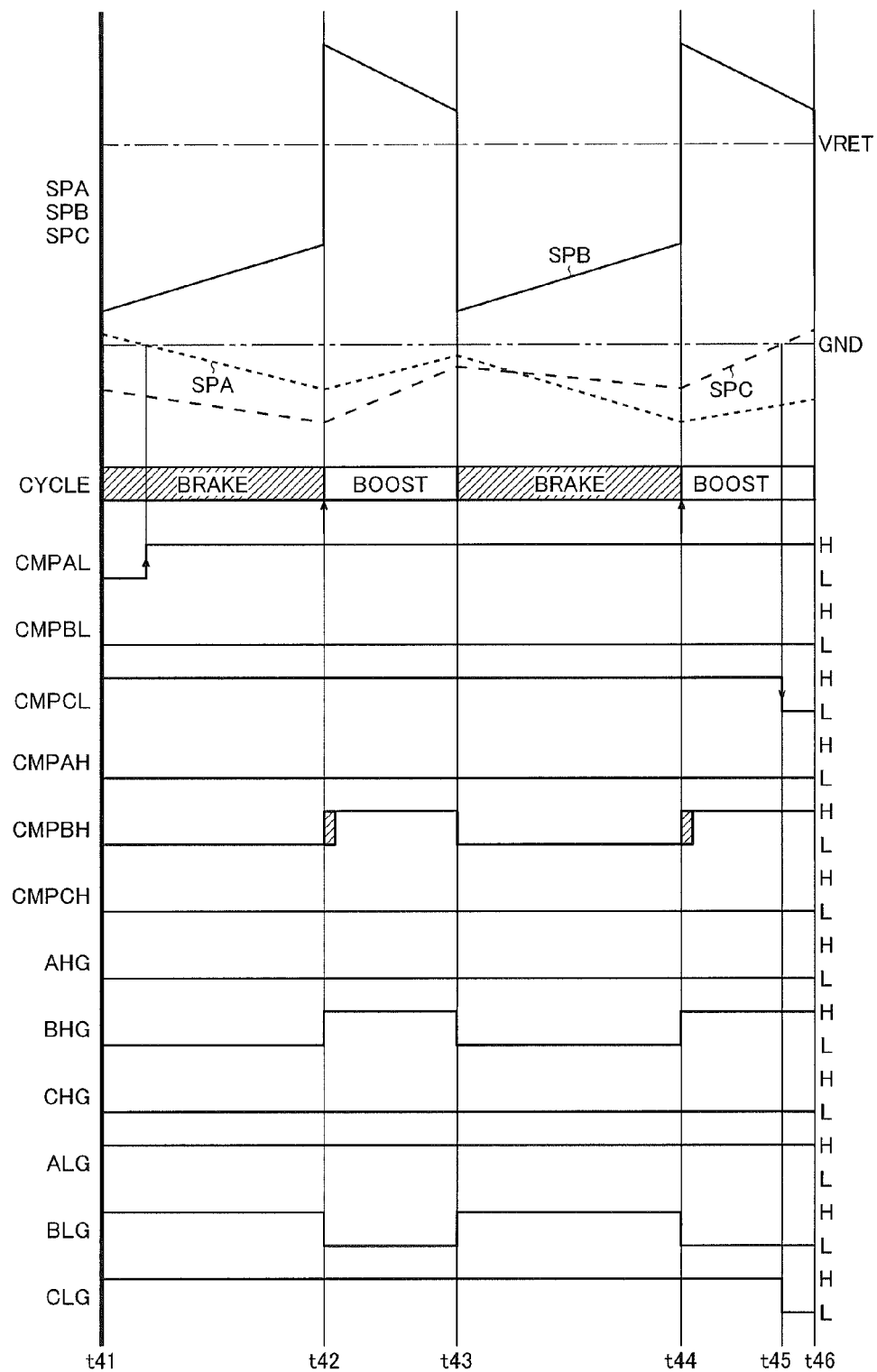
FIG. 10 is a timing chart for showing a first example of cycle switching control.
Figure 11:
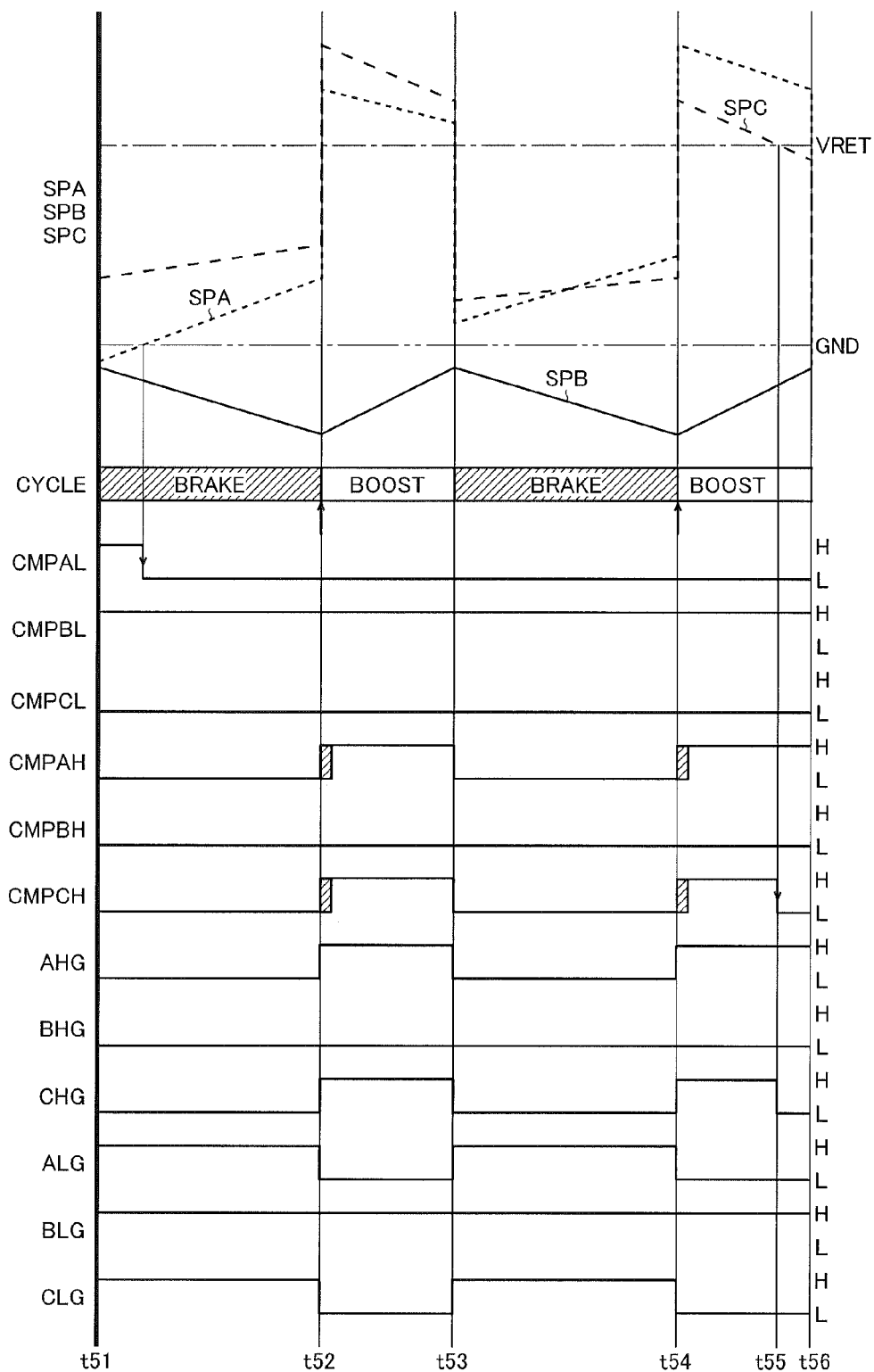
FIG. 11 is a timing chart for showing a second example of cycle switching control.

FIG. 10 and FIG. 11 are timing charts for showing a first example and a second example of the cycle switching control respectively (an enlargement of regions "c" and "d" in FIG. 9). FIG. 10 and FIG. 11 show the phase voltages SPx, the operation cycle, the lower side comparison signals CMPxL, upper side comparison signals CMPxH, the upper side gate signals xHG, and the lower side gate signals xLG are described in order from top. Here, in FIG. 10, it is supposed that the time passes in order of times t41 to t46, and in FIG. 11, it is supposed that the time passes in order of times t51 to t56.

In addition, the first example in FIG. 10 shows the operation when the current flows from the ground line L2 toward an A-phase terminal and a C-phase terminal of the spindle motor 2 and when the current is regenerated from a B-phase terminal of the spindle motor 2 toward the power supply line L1. On the other hand, the second example in FIG. 11 shows the operation when the current flows from the ground line L2 toward the B-phase terminal of the spindle motor 2 and when the current is regenerated from the A-phase terminal and the C-phase terminal of the spindle motor 2 toward the power supply line L1.

As to the brake cycle, the direction of the brake current flowing through between the spindle motor 2 and the ground line L2 can be detected in accordance with the lower side comparison signals CMPxL. Besides, as to the phases in which the lower side comparison signals CMPxL are at a high level (SPx<GND), it can be seen that the brake current flows from the ground line L2 toward the spindle motor 2. To the contrary, as to the phases in which the lower side comparison signals CMPxL are at a low level (SPx>GND), it can be seen that the brake current flows from the spindle motor 2 toward the ground line L2.

Based on the above-mentioned study, the control unit 15 generates the switch control signal Sc so as to turn on the upper side switches 11x and turn off the lower side switches 12x in the boost cycle regarding the phases with the phase voltages SPx higher than the ground voltage GND (the phases in which the lower side comparison signals CMPxL are at a high level) in the brake cycle. On the other hand, the control unit 15 generates the switch control signal Sc so as to turn off the upper side switches 11x and turn on the lower side switches 12x in the boost cycle regarding the phases (the phases in which the lower side comparison signals CMPxL are at a low level) with the phase voltages SPx lower than the ground voltage GND in the brake cycle.

For example, in the first example in FIG. 10, the lower comparison signals CMPAL and CMPCL are at a high level and the lower side comparison signal CMPBL is at a low level in the brake cycle (t41 to t42, and t43 to t44). Therefore, during the boost cycle (t42 to t43, and t44 to t46), the control unit 15 basically generates the switch control signal Sc so as to turn on the upper side switch 11B and the lower side switches 12A and 12C, and so as to turn off the upper side switches 11A and 11C and the lower side switch 12B.

Besides, in the second example in FIG. 11, the lower comparison signals CMPAL and CMPCL are at a low level and the lower side comparison signal CMPBL is at a high level in the brake cycle (t51 to t52, and t53 to t54). Therefore, during the boost cycle (t52 to t53, and t54 to t56), the control unit 15 basically generates the switch control signal Sc so as to turn off the upper side switch 11B and the lower side switches 12A and 12C, and so as to turn on the upper side switches 11A and 11C and the lower side switch 12B.

According to such step-up synchronous rectification operation, it is possible to reduce energy loss during the step-up synchronous rectification operation because the regenerative current efficiently flows toward the power supply voltage L1 without operating the body diodes related to each of the upper side transistors 11x and the lower side transistors 12x as active as possible.

Besides, the spindle motor driver 10 detects the direction of each current flowing through between the spindle motor 2 and the power supply line L1 and between the spindle motor 2 and the ground line GND respectively. The state of the synchronous rectification changes so as to cut off the current as to the phases in which the direction of the current is switched.

Specifically, when the phase voltages SPx become lower than the rectified voltage VRET, the control unit 15 generates the switch control signal Sc so as to turn off the upper side switches 11x regarding the phases in which the upper side switches 11x are turned on in the boost cycle. On the other hand, when the phase voltages SPx exceed the ground voltage GND, the control unit 15 generates the switch control signal Sc so as to turn off the lower side switches 12x regarding the phases in which the lower side switches 12x are turned on in the boost cycle.

For example, in the first example in FIG. 10, as to the C-phase in which the lower side switch 12C is turned on, the phase voltage SPC exceed the ground voltage GND and the lower side comparison signal CMPCL falls from a high level to a low level in the middle of the boost cycle (time t45). The control unit 15 generates the switch control signal Sc so as to turn off the lower side switch 12C when such a falling edge of the lower side comparison signal CMPCL is detected.

Besides, in the second example in FIG. 11, as to the C-phase in which the upper side switch 11C is turned on, the phase voltage SPC becomes lower than the rectified voltage VRET and the upper side comparison signal CMPCH falls from a high level to a low level in the middle of the boost cycle (time t55). The control unit 15 generates the switch control signal Sc so as to turn off the upper side switch 11C when such a falling edge of the upper side comparison signal CMPCH is detected.

According to such switching control, it is possible to reduce energy loss during the boost cycle because a current flowing from the power supply line L1 toward the spindle motor 2 or a current flowing from spindle motor 2 toward the ground line can be cut off without delay.

Besides, the control unit 15 ignores the upper side comparison signals CMPxH of the different phases during a predetermined mask term (hatching terms in FIG. 10 and FIG. 11) when switching the brake cycle to the boost cycle, in consideration of the necessity of a constant rising time until the phase voltages SPx exceed the rectified voltage. By arranging such mask terms, it is possible to prevent incorrect OFF state of the upper side switches 11x in the middle of the rising of the phase voltages SPx.

Here, in order to achieve the step-up synchronous rectification operation, six upper side comparators 13x and lower side comparators 14x in all may be used. However, unlike a case for achieving the above-mentioned synchronous rectification operation (FIG. 4), the upper side comparators 13x and the lower side comparators 14x don't always have hysteresis characteristics.

For example, the first structural examples in FIG. 5 and FIG. 6 need to be adopted as the upper side comparators 13x and lower side comparators 14x in case the spindle motor driver 10 has any one switching function between the synchronous rectification operation (FIG. 4) and the step-up synchronous rectification operation (FIG. 9). However, the switch SW12 and SW22 may be fixed in on state during the step-up synchronous rectification operation (FIG. 9).

Figure 12:
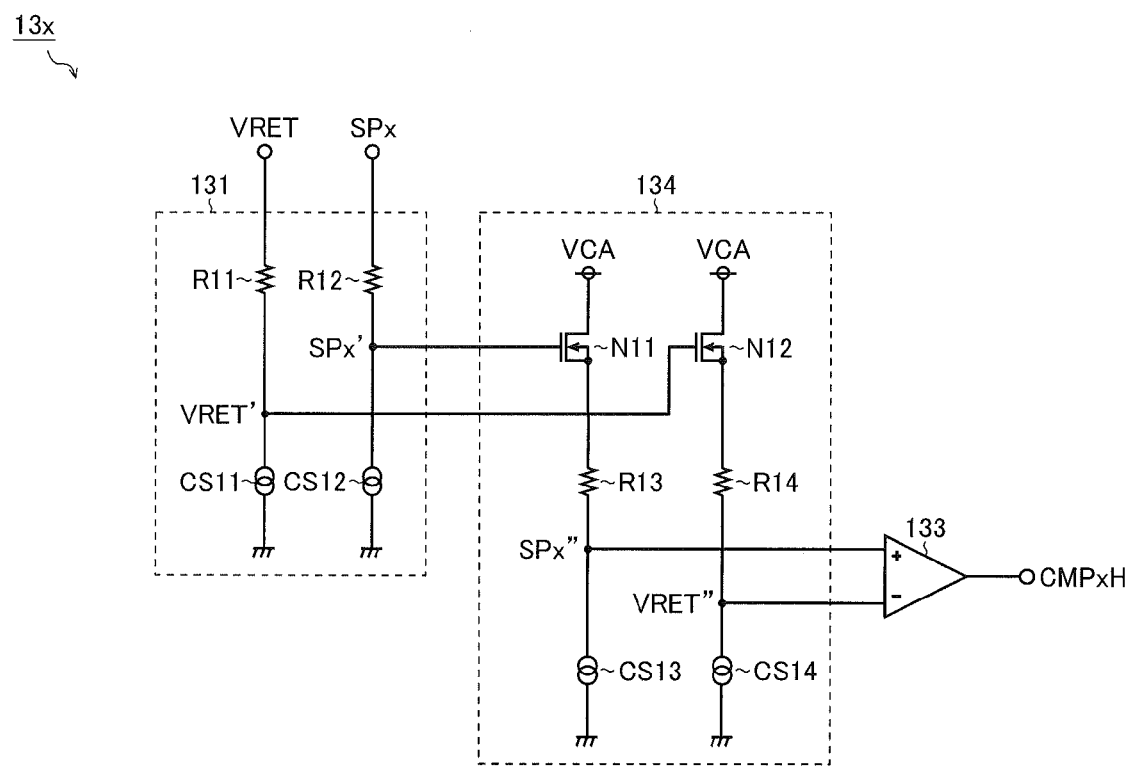
FIG. 12 is a circuit diagram for showing a second structural example of upper side comparators 13x.
Figure 13:
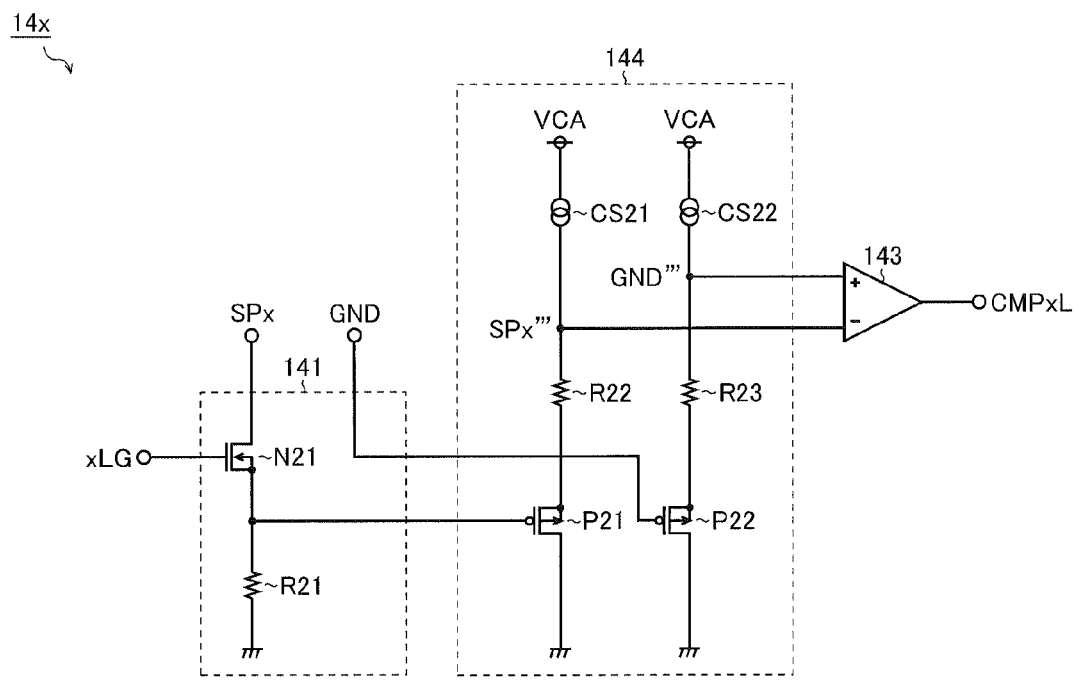
FIG. 13 is a circuit diagram for showing a second structural example of lower comparators 14x.

Besides, in case the spindle motor driver 10 carries out only the step-up synchronous rectification operation (FIG. 9), level shifter units 134 and 144 with a structure that picks out only each level shift function (specifically, the structure in which the resistors R15 and R24 and the switches SW11 to SW13 and SW21 to SW23 are deleted) may be provided instead of the hysteresis control units 132 and 142 as shown in the second structural examples in FIG. 12 and FIG. 13.

Besides, in case of the spindle motor driver 10 carries out only the step-up synchronous rectification operation (FIG. 9), there is no opportunity to compare both the rectified voltage VRET and the ground voltage GND with the phase voltage SPx of one phase at the same time. In view of the above, it is possible to reduce a circuit scale because the upper side comparators 13x and the lower side comparators 14x can be put together on a phase by phase basis as upper side/lower side common comparators 17x.

Here, the upper side/lower side common comparators 17x may comprise a structure in which the target of comparison is switched so as to compare the phase voltage SPx with the rectified voltage VRET if the upper side switch 11x is turned on, and so as to compare the phase voltage SPx with the ground voltage GND if the lower side switch 12x is turned on.

Figure 14:
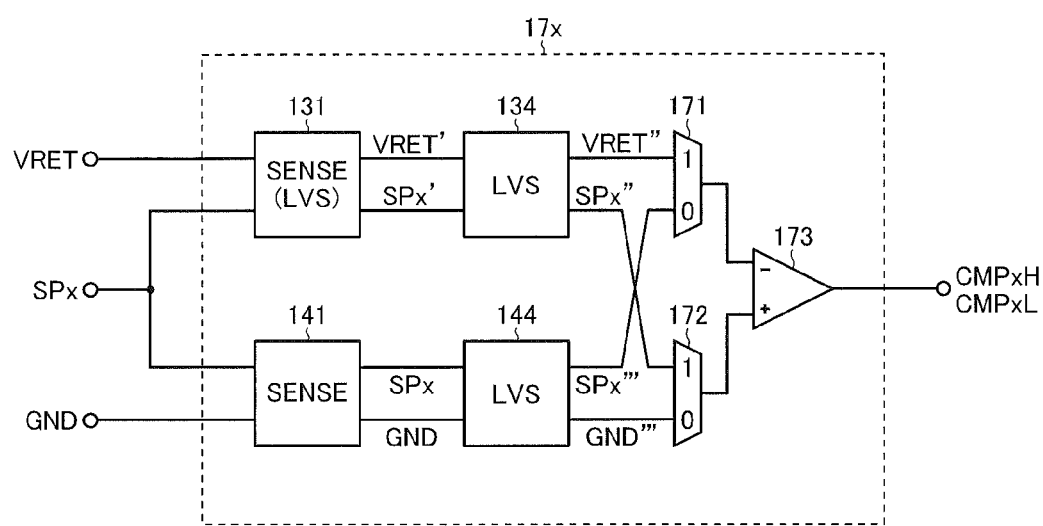
FIG. 14 is a circuit diagram for showing a structural example of upper side/lower side common comparators 17x.

FIG. 14 is a circuit diagram for showing a structural example of upper side/lower side common comparators 17x. The upper side/lower side common comparators 17x in the present structural example have: the above-mentioned voltage input portions 131 and 141; and the level shifter units 134 and 144, and further include selector units 171 and 172; and a voltage comparison unit 173.

The selector unit 171 outputs either the rectified voltage VRET" applied via the level shifter unit 134 or the phase voltage SPx''' applied via the level shifter unit 144. More specifically, the selector unit 171 outputs the phase voltage SPx''' during the brake cycle. On the other hand, during the boost cycle, the selector unit 171 outputs the rectified voltage VRET" if the upper side switch 11x is turned on, and outputs the phase voltage SPx''' if the lower side switch 12x is turned on.

The selector unit 172 outputs either the phase voltage SPx" applied via the level shifter unit 134 or the ground voltage GND''' applied via the level shifter unit 144. More specifically, the selector unit 172 outputs the ground voltage GND''' during the brake cycle. On the other hand, during the boost cycle, the selector unit 172 outputs the phase voltage SPx" if the upper side switch 11x is turned on, and outputs the ground voltage GND''' if the lower side switch 12x is turned on.

The voltage comparison unit 173 generates the upper side comparison signal CMPxH and the lower side comparison signal CMPxL by comparing a selected signal of the selector unit 171 with a selected signal of the selector unit 172 (In fact, an upper side/lower side signal that integrates two kinds of comparison signals as one kind of comparison signal). More specifically, the voltage comparison unit 173 generates the lower side comparison signal CMPxL by comparing the phase voltage SPx''' with the ground voltage GND during the brake cycle. On the other hand, during the boost cycle, the voltage comparison unit 173 generates the upper side comparison signal CMPxH by comparing the phase voltage SPx" with the rectified voltage VRET" if the upper side switches 11x are turned on, and generates the lower side comparison signal CMPxL by comparing the phase voltage SPx''' with the ground voltage GND''' if the lower side switches 12x are turned on.

<Application to Hard Disk Drive>

Figure 15:
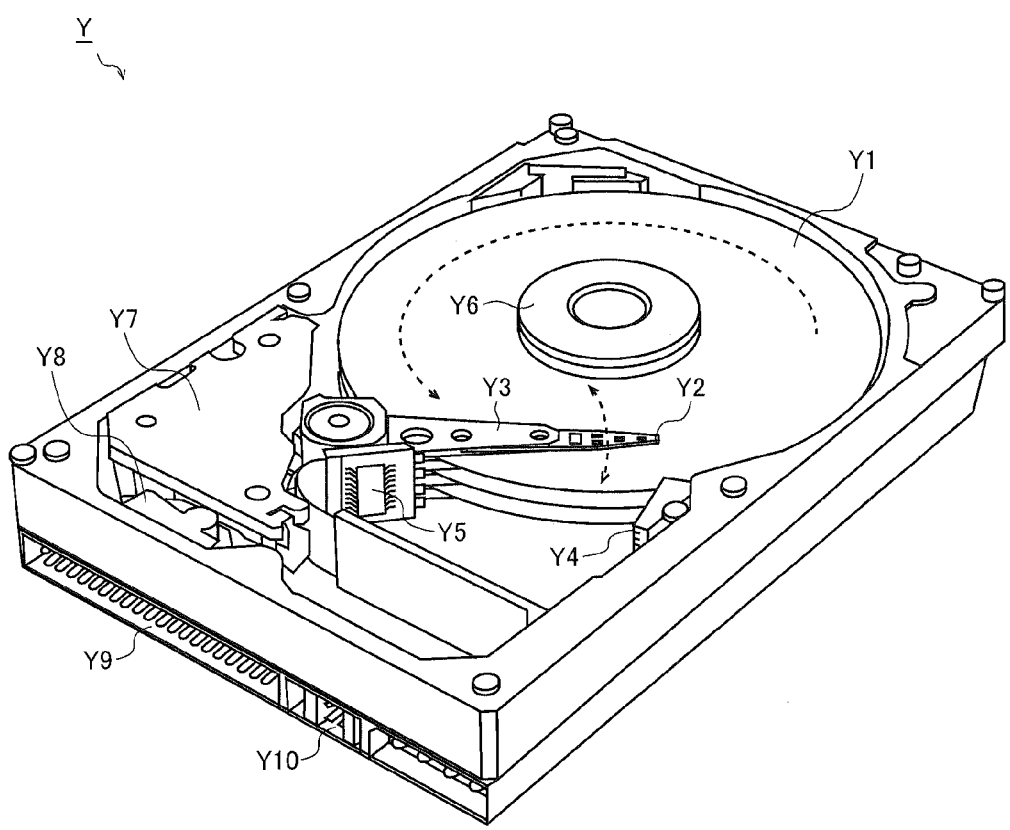
FIG. 15 is a perspective view for showing a structural example of a hard disk drive provided with a motor drive device.

FIG. 15 is a perspective view (with a top cover removed) for showing a structural example of a hard disk drive that incorporates the motor drive device. A hard disk drive Y in the present structural example is a kind of magnetic disk storage device and has: a platter Y1; a magnetic head Y2; a swing arm Y3; a lamp mechanism Y4; a head amplifier Y5; a spindle motor Y6; a voice coil motor Y7; a latch mechanism Y8; an interface connector Y9; and a jumper switch Y10.

The platter Y1 is a magnetic disk that is formed by laminating a magnetic layer on a surface of an aluminum board or a glass board. One hard disk drive Y incorporates one to four platters Y1.

The magnetic head Y2 reads and writes data to and from the platter Y1.

The swing arm Y3 holds the magnetic head Y2 at a tip end thereof.

The lamp mechanism Y4 is an evacuation place for the magnetic head Y2 during a time the platter Y1 does not rotate, and is disposed further outside an outermost circumference of the platter Y1.

The head amplifier Y5 amplifies a regenerative signal obtained by the magnetic head Y2.

The spindle motor Y6 (corresponding to the spindle motor 2 in FIG. 1) rotates the platter Y1 at predetermined rotation speeds (4200 rpm, 5400 rpm, 7200 rpm, 10000 rpm, 15000 rpm and the like).

The voice coil motor Y7 (corresponding to the voice coil motor 3 in FIG. 3) moves the swing arm Y3 in an arc, thereby moving the magnetic head Y2 in a radial direction of the platter Y1.

The latch mechanism Y8 holds the swing arm Y3 during a time the hard disk drive Y is stopped.

The interface connector Y9 is connected to a host interface circuit, which is mounted on a mother board of a personal computer and the like, over a cable.

The jumper switch Y10 is a switch for performing the machine setting (master/slave and the like) of the hard disk drive Y by means of a jumper pin when connecting a plurality of the hard disk drives to one personal computer.

Here, though not shown in FIG. 15, the hard disk drive Y is provided with a printed board on which various electronic circuits are mounted. In addition, the motor drive device 10 in FIG. 1 is mounted on the above-mentioned printed board as means for driving the spindle motor Y6 and the voice coil motor Y7.

<Application to Desktop Personal Computer>

Figure 16:
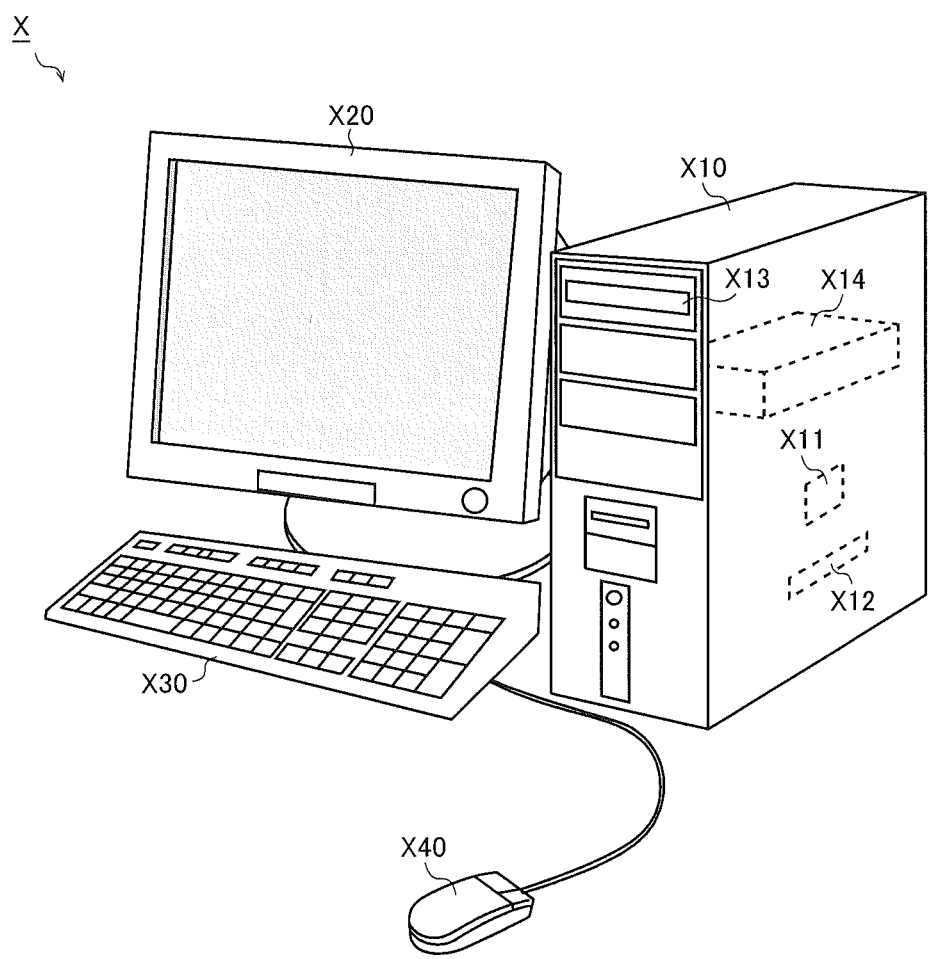
FIG. 16 is an appearance view showing a structural example of a personal computer that incorporates a hard disk drive.

FIG. 16 is an appearance view showing a structural example of a desktop personal computer that incorporates the hard disk drive. A desktop personal computer X in the present structural example has: a main body case X10; a liquid crystal monitor X20; a keyboard X30; and a mouse X40.

The main body case X10 houses: a central processing unit X11; a memory X12; an optical drive X13; a hard disk drive X14 and the like.

The central processing unit X11 executes an operating system and various application programs stored in the hard disk drive X14, thereby controlling comprehensively operation of the desktop personal computer X.

The memory X12 is used as a working region (e.g., a region for storing task data when executing a program) for the central processing unit X11.

The optical drive X13 performs reading/writing of data to and from an optical disk. As the optical disk, there are a CD [compact disk], a DVD [digital versatile disc], a BD [Blu-ray disc] and the like.

The hard disk drive X14 (corresponding to the hard disk drive Y in FIG. 15) is a large-capacity auxiliary storage device that stores the programs and data in a non-volatile way by means of a magnetic disk sealed tightly in the housing.

The liquid crystal monitor X20 outputs an image based on an instruction from the central processing unit X11.

The keyboard X30 and the mouse X40 are each a human interface device that accepts operation by a user.

<Other Modifications>

Here, the above embodiments are described as an example of a desktop personal computer that incorporates a hard disk drive; however, an invention disclosed in the present specification is generally applicable, for example, to various electronic apparatus (laptop computers, tablet personal computers, hard disk recorders, audio players, game machines and the like) that incorporate a hard disk drive.

Besides, in addition to the above embodiments, it is possible to add various modifications to the invention disclosed in the present specification without departing the spirit of the technological creation. For example, in the above embodiments, a motor drive device for driving a 3-phase spindle motor is described as an example; however, the number of phases of the motor is not limited to this, and the invention disclosed in the present specification is generally applicable to motor drive devices for driving N-phase motors (where N is an integer of 2 or more), in addition, applications that incorporate a motor drive device are not limited to a magnetic disk storage device.

In other words, it should be understood that the above embodiments are examples in all respects and are not limiting; the technological scope of the present invention is not indicated by the above description of the embodiments but by the claims; and all modifications within the scope of the claims and the meaning equivalent to the claims are covered.

Industrial Applicability

The technology disclosed in the present specification is usable as a technology for improving, for example, reliability of a hard disk drive.

What is claimed is:

1. A motor drive device comprising:
a power supply line to which a power supply voltage is applied;
a ground line to which a ground voltage is applied; and
a first motor driver that, when the power supply voltage is normal, rotates an N-phase first motor (where N is an integer of 2 or more) by using the supply voltage and, when the power supply voltage is abnormal, generates a rectified voltage from phase voltages of different phases appearing while the first motor is idling to regenerate the rectified voltage to the power supply line, wherein
the first motor driver, when generating the rectified voltage, boosts the rectified voltage by periodically repeating a brake cycle to make all the terminals of the different phases of the first motor conduct to the ground line and a boost cycle to rectify the phase voltages of the different phases synchronously while making at least one of the terminals of the different phases conduct to the power supply line, wherein the first motor driver detects a direction of a current flowing through between the first motor and the ground line during the brake cycle, and then determine a state of a synchronous rectification during the boost cycle in accordance with a detection result, wherein
the first motor driver detects a direction of each current flowing through between the first motor and the power supply line and between the first motor and the ground line, and the state of the synchronous rectification changes so as to cut off the current as to the phase in which the direction of the current is switched, and wherein
the first motor driver includes:
N-phase upper side switches that conduct/disconnect between different phase terminals of the first motor and the power supply line to and from each other,
N-phase lower side switches that conduct/disconnect between different phase terminals of the first motor and the ground line to and from each other,
N-phase upper side comparators that generate the upper side comparison signals of the different phases by comparing the rectified voltage with the phase voltages of the different phases respectively,
N-phase lower side comparators that generate the lower side comparison signals of the different phases by comparing the ground voltage with the phase voltages of the different phases respectively,
a control unit that generates a switch control signal in accordance with the upper side comparison signals and the lower side comparison signals of the different phases, and
a pre-driver unit that turns on and off the upper side switches and the lower side switches of the different phases in accordance with the switch control signal.

2. The motor drive device according to claim 1, wherein the control unit generates the switch control signal so as to turn on the upper side switches and turn off the lower side switches in the boost cycle regarding the phases with the phase voltages higher than the ground voltage in the brake cycle, on the other hand, the control unit generates the switch control signal so as to turn off the upper side switches and turn on the lower side switches in the boost cycle regarding the phases with the phase voltages lower than the ground voltage in the brake cycle.

3. The motor drive device according to claim 2, wherein the control unit, when the phase voltages become lower than the rectified voltage, generates the switch control signal so as to turn off the upper side switches regarding the phases in which the upper side switches are turned on in the boost cycle, on the other hand, the control unit, when the phase voltages exceed the ground voltage, generates the switch control signal so as to turn off the lower side switches regarding the phases in which the lower side switches are turned on in the boost cycle.

4. The motor drive device according to claim 3, wherein the control unit ignores the upper side comparison signals of the different phases during a predetermined mask term when switching the brake cycle to the boost cycle.

5. The motor drive device according to claim 1, wherein each of the upper side comparators of the different phases includes:
a first voltage input portion that receive the rectified voltage and the phase voltage;
a first level shifter unit that reduces both the rectified voltage and the phase voltage applied via the first voltage input portion; and a first voltage comparison unit that generates the upper side comparison signal by comparison between the rectified voltage and the phase voltage received via the first level shifter unit.

6. The motor drive device according to claim 5, wherein the first voltage input portion reduces both the rectified voltage and the phase voltage to transmit both the voltages thus reduced to the first voltage comparison unit.

7. The motor drive device according to claim 1, wherein each of the lower side comparators of the different phases includes:
a second voltage input portion that receive the ground voltage and the phase voltage;
a second level shifter unit that raises both the rectified voltage and the phase voltage applied via the second voltage input portion; and
a second voltage comparison unit that generates the upper side comparison signal by comparison between the ground voltage and the phase voltage received via the second level shifter unit.

8. The motor drive device according to claim 7, wherein the second voltage input portion receives the rectified voltage, only when the lower side switch of the corresponding phase is turned on.

9. The motor drive device according to claim 1, wherein Each of the upper side comparators and the lower side comparators of the different phases is put together on a phase by phase basis as an upper side/lower side common comparator, and the upper side/lower side common comparator has a structure in which the target of comparison is switched so as to compare the phase voltage with the rectified voltage if the upper side switch is turned on, and so as to compare the phase voltage with the ground voltage if the lower side switch is turned on.

10. The motor drive device according to claim 9, wherein the upper side/lower side common comparator includes:
a first voltage input portion that receive the rectified voltage and the phase voltage;
a first level shifter unit that reduces both the rectified voltage and the phase voltage applied via the first voltage input portion;
a second voltage input portion that receive the ground voltage and the phase voltage;
a second level shifter unit that raises both the rectified voltage and the phase voltage applied via the second voltage input portion;
a first selector unit that outputs either the rectified voltage applied via the first level shifter unit or the phase voltage applied via the second level shifter unit;
a second selector unit that outputs either the phase voltage applied via the first level shifter unit or the ground voltage applied via the second level shifter unit; and
a voltage comparison unit generates the upper side comparison signal and the lower side comparison signal by comparing a selected signal of the first selector unit with a selected signal of the second selector unit.

11. The motor drive device according to claim 10, wherein the first voltage input portion reduces both the rectified voltage and the phase voltage to transmit both the voltages thus reduced to the first level shifter unit.

12. The motor drive device according to claim 10, wherein the second voltage input portion receives the rectified voltage, only when the lower side switch of the corresponding phase is turned on.

13. The motor drive device according to claim 1, further comprising:

an insulation switch that conducts/disconnects an application terminal of the power supply voltage and the power supply line to and from each other.

14. The motor drive device according to claim 1, further comprising:
a second motor unit that is connected in series between the power supply line and the ground line to generate a second motor.

15. A magnetic disk storage device comprising:
a platter;
a magnetic head that reads and writes data from and to the platter;
a swing arm that holds the magnetic head at a tip end thereof;
a spindle motor that rotates the platter;
a voice coil motor that moves the swing arm in an arc; and
a motor drive device that drives the spindle motor and the voice coil motor as a first motor and a second motor; wherein
the motor drive device includes:
a power supply line to which a power supply voltage is applied;
a ground line to which a ground voltage is applied; and
a first motor driver that, when the power supply voltage is normal, rotates an N-phase first motor (where N is an integer of 2 or more) by using the supply voltage and, when the power supply voltage is abnormal, generates a rectified voltage from phase voltages of different phases appearing while the first motor is idling to regenerate the rectified voltage to the power supply line, wherein
the first motor driver, when generating the rectified voltage, boosts the rectified voltage by periodically repeating a brake cycle to make all the terminals of the different phases of the first motor conduct to the ground line and a boost cycle to rectify the phase voltages of the different phases synchronously while making at least one of the terminals of the different phases conduct to the power supply line, wherein
the first motor driver detects a direction of a current flowing through between the first motor and the ground line during the brake cycle, and then determine a state of a synchronous rectification during the boost cycle in accordance with a detection result, wherein
the first motor driver detects a direction of each current flowing through between the first motor and the power supply line and between the first motor and the ground line, and the state of the synchronous rectification changes so as to cut off the current as to the phase in which the direction of the current is switched, and wherein
the first motor driver includes:
N-phase upper side switches that conduct/disconnect between different phase terminals of the first motor and the power supply line to and from each other,
N-phase lower side switches that conduct/disconnect between different phase terminals of the first motor and the ground line to and from each other,
N-phase upper side comparators that generate the upper side comparison signals of the different phases by comparing the rectified voltage with the phase voltages of the different phases respectively,
N-phase lower side comparators that generate the lower side comparison signals of the different phases by comparing the ground voltage with the phase voltages of the different phases respectively, a control unit that generates a switch control signal in accordance with the upper side comparison signals and the lower side comparison signals of the different phases, and a pre-driver unit that turns on and off the upper side switches and the lower side switches of the different phases in accordance with the switch control signal.

16. An electronic apparatus comprising:

a magnetic disk storage device; wherein the magnetic disk storage device includes:

a platter;

a magnetic head that reads and writes data from and to the platter;

a swing arm that holds the magnetic head at a tip end thereof;

a spindle motor that rotates the platter;

a voice coil motor that moves the swing arm in an arc; and a motor drive device that drives the spindle motor and the voice coil motor as a first motor and a second motor; wherein the motor drive device includes:

a power supply line to which a power supply voltage is applied;

a ground line to which a ground voltage is applied; and a first motor driver that, when the power supply voltage is normal, rotates an N-phase first motor (where N is an integer of 2 or more) by using the supply voltage and, when the power supply voltage is abnormal, generates a rectified voltage from phase voltages of different phases appearing while the first motor is idling to regenerate the rectified voltage to the power supply line, wherein the first motor driver, when generating the rectified voltage, boosts the rectified voltage by periodically repeating a brake cycle to make all the terminals of the different phases of the first motor conduct to the ground line and a boost cycle to rectify the phase voltages of the different phases synchronously while making at least one of the terminals of the different phases conduct to the power supply line, wherein the first motor driver detects a direction of a current flowing through between the first motor and the ground line during the brake cycle, and then determine a state of a synchronous rectification during the boost cycle in accordance with a detection result, wherein the first motor driver detects a direction of each current flowing through between the first motor and the power supply line and between the first motor and the ground line, and the state of the synchronous rectification changes so as to cut off the current as to the phase in which the direction of the current is switched, and wherein the first motor driver includes:

N-phase upper side switches that conduct/disconnect between different phase terminals of the first motor and the power supply line to and from each other, N-phase lower side switches that conduct/disconnect between different phase terminals of the first motor and the ground line to and from each other, N-phase upper side comparators that generate the upper side comparison signals of the different phases by comparing the rectified voltage with the phase voltages of the different phases respectively, N-phase lower side comparators that generate the lower side comparison signals of the different phases by comparing the ground voltage with the phase voltages of the different phases respectively, a control unit that generates a switch control signal in accordance with the upper side comparison signals and the lower side comparison signals of the different phases, and a pre-driver unit that turns on and off the upper side switches and the lower side switches of the different phases in accordance with the switch control signal.

* * * * *